(12) United States Patent
Edge

(10) Patent No.: US 9,386,408 B2
(45) Date of Patent: *Jul. 5, 2016

(54) GENERIC POSITIONING PROTOCOL

(71) Applicant: QUALCOMM Incorporated, San Diego, CA (US)

(72) Inventor: Stephen W. Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/189,927

(22) Filed: Feb. 25, 2014

(65) Prior Publication Data

US 2014/0206390 A1 Jul. 24, 2014

Related U.S. Application Data

(63) Continuation of application No. 12/416,348, filed on Apr. 1, 2009, now Pat. No. 8,660,574.

(60) Provisional application No. 61/041,871, filed on Apr. 2, 2008, provisional application No. 61/055,830, filed on May 23, 2008.

(51) Int. Cl.
 *H04W 24/00* (2009.01)
 *H04W 4/02* (2009.01)
 (Continued)

(52) U.S. Cl.
 CPC .............. *H04W 4/02* (2013.01); *G01S 5/0018* (2013.01); *G01S 19/03* (2013.01); *G01S 19/05* (2013.01); *H04W 4/12* (2013.01); *H04W 64/003* (2013.01)

(58) Field of Classification Search
 CPC ....... H04W 4/02; H04W 4/021; H04W 4/023; H04W 4/025; H04W 4/028; H04W 4/04; H04W 64/003

USPC .......... 455/456.1, 456.2, 456.3, 404.1, 404.2, 455/456.5, 456.6

See application file for complete search history.

(56) References Cited

U.S. PATENT DOCUMENTS 6,823,260 B1 11/2004 Turcotte
6,999,762 B2 2/2006 Uchida (Continued)

FOREIGN PATENT DOCUMENTS

CN 1848845 A 10/2006
EP 2045613 A1 4/2009

(Continued)

OTHER PUBLICATIONS

3GPP: "Overview of 3GPP Release 9 V0.0.5 (Apr. 2009)", pp. 1-174, Apr. 14, 2009.
3GPP TS 25.331 V8.1.0 (Dec. 2007); Release 8, 3rd Generation Partnership Project:Sections 8.4, 8,5.7, 10.2.4, 10.2.17, 10.2.18, 10.2.19, 10.3.3,45, 10,3.3.45a, 10.3.7, 10.3.8, 14.7 of pages 1through 1471.

(Continued)

*Primary Examiner* — Jean Gelin
(74) *Attorney, Agent, or Firm* — Thomas A. Jolly

(57) ABSTRACT

In an aspect, a generic positioning protocol (GPP) may be used to support satellite-based positioning methods and terrestrial-based positioning methods for different access types. A terminal may exchange a first GPP message with first information for a positioning method and an access type supported by GPP. The terminal may exchange a second GPP message with second information for the positioning method and the access type. Each GPP message may include at least one position element, and each position element may be for a specific positioning method. The terminal may obtain a position estimate for itself based on the second information. In another aspect, positioning may be performed based on measurements for cells of different wireless access types. In yet another aspect, received transmission times may be transformed to converted times based on common timing, which may be applicable for multiple wireless access types.

20 Claims, 16 Drawing Sheets

(51) Int. Cl.
*G01S 5/00* (2006.01)
*G01S 19/03* (2010.01)
*G01S 19/05* (2010.01)
*H04W 64/00* (2009.01)
*H04W 4/12* (2009.01)

(56) References Cited

U.S. PATENT DOCUMENTS

| | | | |
|---|---|---|---|
| 7,370,118 B2 | 5/2008 | Tan et al. | |
| 7,376,430 B2 | 5/2008 | Matsuda | |
| 7,768,449 B2 | 8/2010 | Gaal et al. | |
| 7,940,740 B2 | 5/2011 | Krishnamurthy et al. | |
| 8,358,243 B2 | 1/2013 | Lin et al. | |
| 8,483,706 B2 | 7/2013 | Edge et al. | |
| 8,660,540 B2 | 2/2014 | Edge et al. | |
| 8,660,574 B2 | 2/2014 | Edge | |
| 8,838,132 B2 | 9/2014 | Prakash et al. | |
| 2003/0005085 A1 | 1/2003 | Matsuno | |
| 2003/0022674 A1 | 1/2003 | Shintai et al. | |
| 2003/0036378 A1 | 2/2003 | Dent | |
| 2003/0096624 A1 | 5/2003 | Ormson | |
| 2003/0220765 A1 | 11/2003 | Overy et al. | |
| 2005/0148340 A1 | 7/2005 | Guyot | |
| 2005/0162307 A1 | 7/2005 | Kato | |
| 2006/0063534 A1 | 3/2006 | Kokkonen et al. | |
| 2007/0005335 A1 | 1/2007 | Almstrom | |
| 2007/0014282 A1 | 1/2007 | Mitchell | |
| 2007/0082682 A1 | 4/2007 | Kim et al. | |
| 2007/0135089 A1 | 6/2007 | Edge et al. | |
| 2007/0149213 A1 | 6/2007 | Lamba et al. | |
| 2007/0178913 A1 | 8/2007 | Niemenmaa et al. | |
| 2007/0207772 A1 | 9/2007 | Huber et al. | |
| 2008/0008157 A1 | 1/2008 | Edge et al. | |
| 2008/0032706 A1 | 2/2008 | Sheynblat et al. | |
| 2008/0227463 A1 | 9/2008 | Hizume et al. | |
| 2008/0227465 A1 | 9/2008 | Wachter et al. | |
| 2008/0228654 A1* | 9/2008 | Edge ................................ | 705/71 |
| 2009/0088180 A1 | 4/2009 | LaMance et al. | |
| 2009/0160711 A1 | 6/2009 | Mehta | |
| 2009/0181698 A1 | 7/2009 | Farmer et al. | |
| 2010/0004003 A1 | 1/2010 | Duggal et al. | |
| 2010/0013701 A1 | 1/2010 | Fischer et al. | |
| 2010/0227626 A1 | 9/2010 | Dressler et al. | |
| 2010/0331013 A1 | 12/2010 | Zhang | |
| 2011/0009130 A1 | 1/2011 | Wu | |
| 2011/0039574 A1 | 2/2011 | Charbit et al. | |
| 2011/0039575 A1 | 2/2011 | Castillo et al. | |
| 2011/0098057 A1 | 4/2011 | Edge et al. | |
| 2011/0117925 A1 | 5/2011 | Sampath et al. | |
| 2012/0015666 A1 | 1/2012 | Horn et al. | |
| 2012/0027110 A1 | 2/2012 | Han et al. | |
| 2012/0040687 A1 | 2/2012 | Siomina et al. | |
| 2012/0040696 A1 | 2/2012 | Siomina et al. | |
| 2012/0083288 A1 | 4/2012 | Siomina | |
| 2012/0147772 A1 | 6/2012 | Kazmi et al. | |
| 2012/0329476 A1 | 12/2012 | Tenny | |
| 2014/0161046 A1 | 6/2014 | Edge et al. | |

FOREIGN PATENT DOCUMENTS

| | | |
|---|---|---|
| EP | 2278842 A1 | 1/2011 |
| GB | 2382270 A | 5/2003 |
| JP | 2003204573 A | 7/2003 |
| JP | 2004104349 A | 4/2004 |
| JP | 2004516479 A | 6/2004 |
| JP | 2004279409 A | 10/2004 |
| JP | 2005207888 A | 8/2005 |
| JP | 2006521552 A | 9/2006 |
| JP | 2012531583 A | 12/2012 |
| JP | 2014503163 A | 2/2014 |
| KR | 20070039850 A | 4/2007 |
| RU | 2107925 C1 | 3/1998 |
| RU | 2263412 C2 | 3/2004 |
| RU | 2316152 C2 | 1/2008 |
| WO | WO-9427160 A1 | 11/1994 |
| WO | WO-0152569 A1 | 7/2001 |
| WO | WO-0172060 A1 | 9/2001 |
| WO | WO-0250562 A1 | 6/2002 |
| WO | WO-03007633 A1 | 1/2003 |
| WO | WO-03034765 A1 | 4/2003 |
| WO | 2004086080 A1 | 10/2004 |
| WO | 2005004527 A1 | 1/2005 |
| WO | WO-2007035736 A2 | 3/2007 |
| WO | WO-2007056738 A2 | 5/2007 |
| WO | 2007082038 A1 | 7/2007 |
| WO | WO-2008016901 A2 | 2/2008 |
| WO | WO-2008085439 A1 | 7/2008 |
| WO | WO-2008089288 A2 | 7/2008 |
| WO | WO-2008112819 A2 | 9/2008 |
| WO | WO-2009036205 A1 | 3/2009 |
| WO | 2009082728 A2 | 7/2009 |
| WO | WO-2009129344 | 10/2009 |
| WO | WO-2010008682 A1 | 1/2010 |
| WO | WO-2010009439 A1 | 1/2010 |
| WO | WO-2010151217 A2 | 12/2010 |
| WO | WO-2011019917 A1 | 2/2011 |
| WO | WO-2012099514 A1 | 7/2012 |

OTHER PUBLICATIONS

3GPP TS 44.031 V7.8.0 Mar. 2008; 3rd Generation Partnership Project; Technical Specification Group GSM/EDGE Radio Access Network; Location Services (LCS); Mobile Station (MS)—Serving Mobile Location Centre (SMLC) Radio Resource LCS Protocol (RRLP), (Release 7), Mar. 2008.

3GPP2 C.S0022-0, Version 3.0, 3rd Generation Partnership Prooject 2 "3GPP2", "Position Determination Service Standard for Dual Mode Spread Spectrum Systems," Feb. 16, 2001.

3GPP2 C.S0022-A, Version 1.0, (TIA:IS-801-A), Position Determination Service for cdma2000 Spread Spectrum Systems, Mar. 2004.

"Secure User Plane Location Architecture; Draft Version 2.0, Mar. 18, 2008, OMA-AD-SUPL-V2_0-20080318-D; Open Mobile Alliance," Internet Citation, Mar. 18, 2008, pp. 1-57, XP007912186.

International Search Report and Written Opinion—PCT/US2009/039349, International Search Authority—European Patent Office—Jul. 19, 2010.

Motorola: "Positioning Support for LTE Rel-9—RAN1 Specific Issues," 3GPP Draft; R1-090321—Positioning Support for LTE REL-9, 3rd Generation Partnership Project (3GPP), Mobile Competence Centre, Jan. 11-16, 2008, retrieved on Jan. 8, 2009, XP050318233.

Nord J et al: "An Architecture for Location Aware Applications," System Sciences, 2002. HICSS. Proceedings of the 35th Annual Hawaii International Conference on Jan. 7-10, 2002; IEEE, vol. 9, Jan. 7, 2002, IEEE, pp. 293-298, XP010587713, ISBN: 978-0-7695-1435-2, http://pure.ltu.se/portal/files/113899/artikel.pdf.

Orville R.E., "Development of the National Lightning Detection Network," BAMS, Feb. 2008, 11 pages.

Sayed A.H., "Network-Based Wireless Location", IEEE Signal Processing Magazine, 2005, pp. 24-40, URL: http://www.ee.ucla.edu/-tarighat/pdf/spm_05_Loation.pdf.

Taiwan Search Report—TW098111038—TIPO—Apr. 29, 2013.

"Userplane Location Protocol; Draft Version 2.0, Mar. 14, 2008; OMA-TS-ULP-V2_0-20080314-D, Open Mobile Alliance," Internet Citation, Mar. 14, 2008, pp. 1-24, XP007912187.

Wirola L., et al., "Requirements for the next generation standardized location technology protocol for location-based services", Journal of Global Positioning Systems, 2008, pp. 91-103, vol. 7 (2), http://www.gnss.com.au/JoGPS/v7n21JoGPS_v7n2p91-103.pdf.

QUALCOMM Europe: "LCS Control Plane Alternatives for EPS", 3GPP Draft; S2-085599 (LCS Control Plane Solution for EPS), 3rd Generation Partnership Project (3GPP), Mobile Competence Centre ; 650, Route des Lucioles ; F-06921 Sophia-Antipolis Cedex ; France, vol. SA WG2, no. Sophia Antipolis, France; 20080825-20080829, Aug. 19, 2008, XP050628859, [retrieved on Aug. 19, 2008]* chapter 1.1 chapters 10.2, 10.3 figures 22, 23.

* cited by examiner

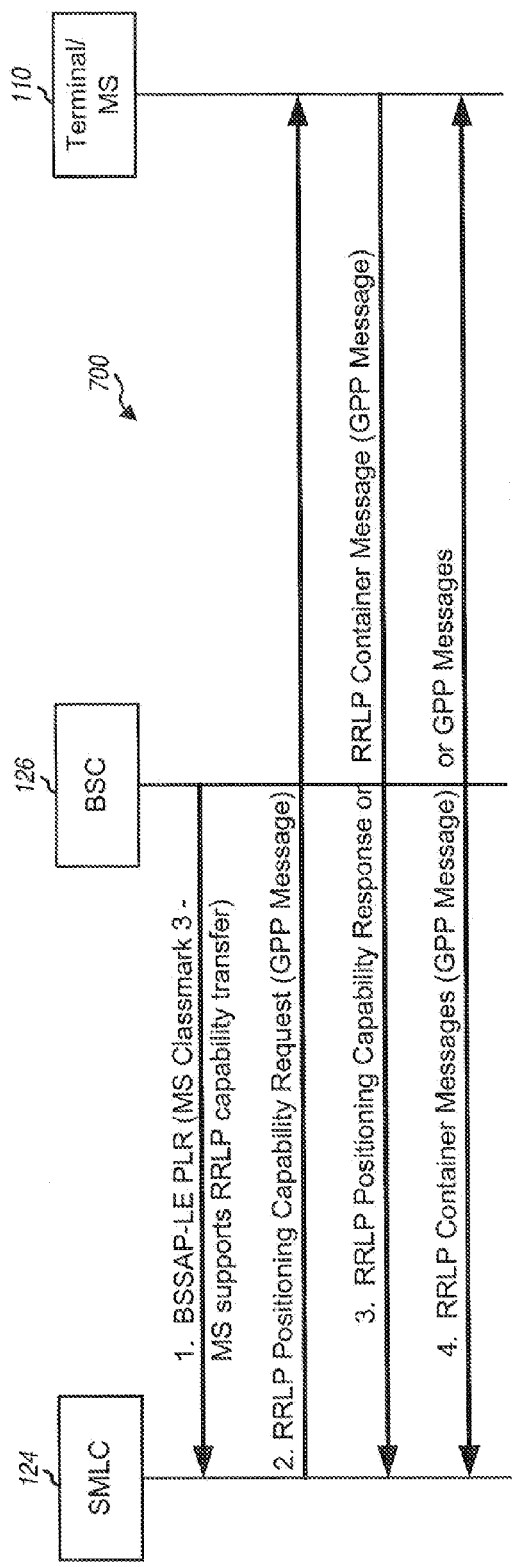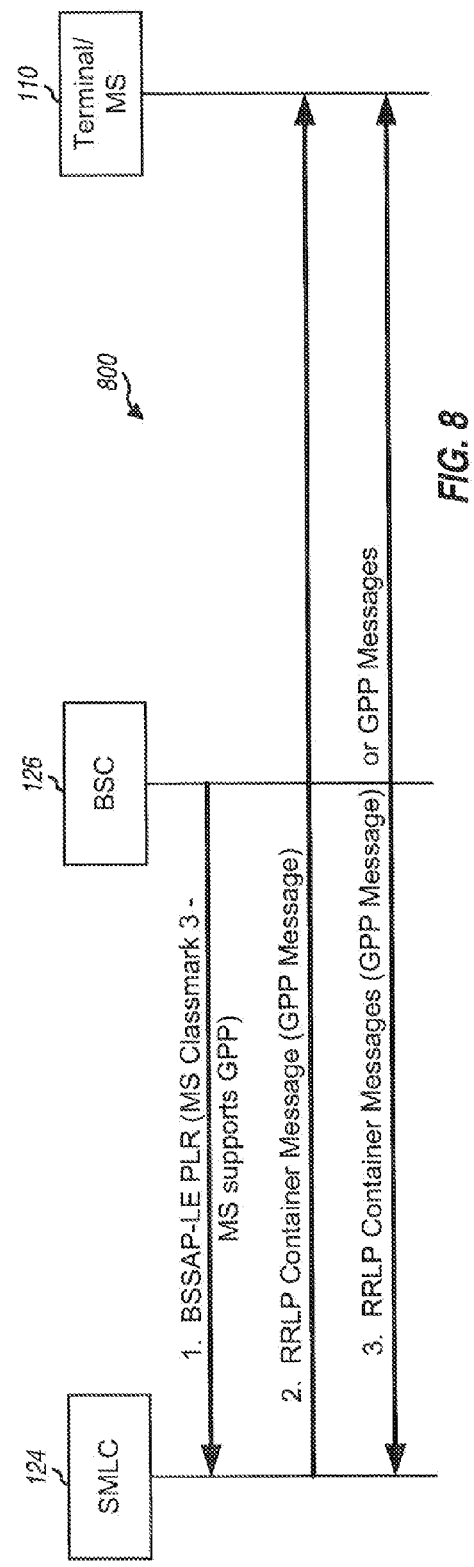

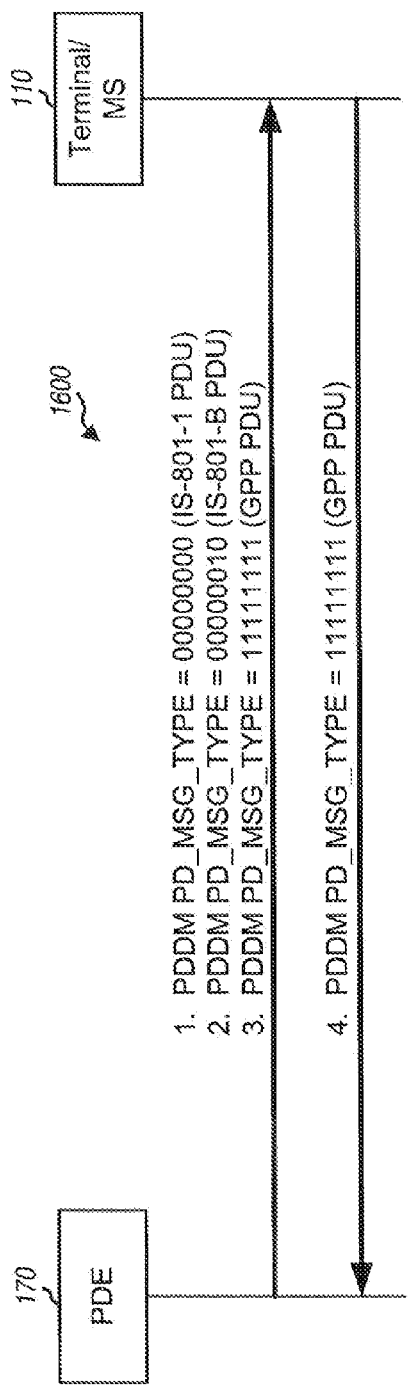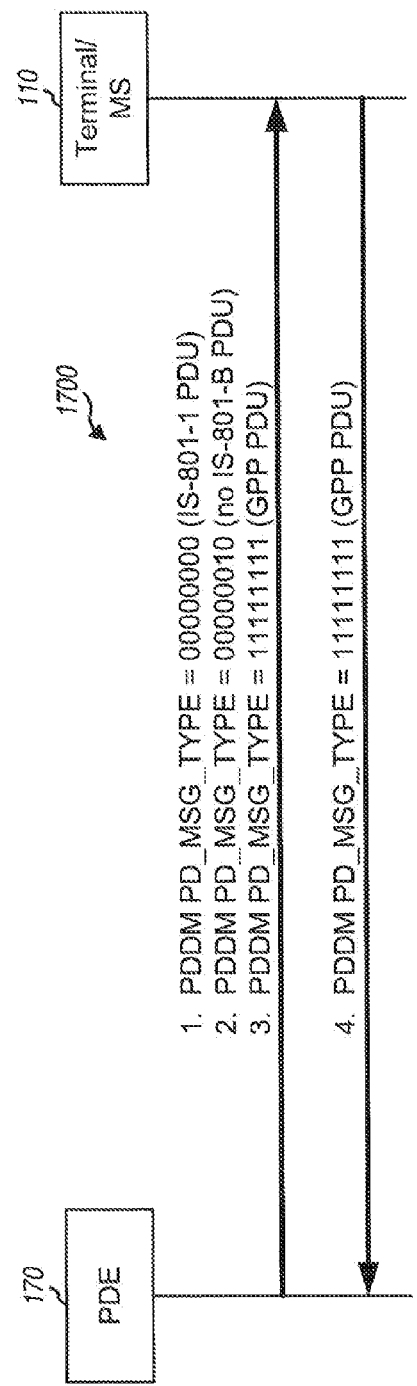

GENERIC POSITIONING PROTOCOL

The present application claims priority to U.S. application Ser. No. 12/416,348, entitled, "Generic Positioning Protocol", filed Apr. 1, 2009, and provisional U.S. Application Ser. No. 61/041,871, entitled "Generic Positioning Protocol for Any Wireless Access," filed Apr. 2, 2008, and provisional U.S. Application Ser. No. 61/055,830, entitled "Generic Positioning Protocol for Any Wireless Access," filed May 23, 2008, all of which are assigned to the assignee hereof and which are expressly incorporated herein by reference.

BACKGROUND

I. Field

The present disclosure relates generally to communication, and more specifically to techniques for supporting location services (LCS) for terminals.

II. Background

It is often desirable, and sometimes necessary, to know the location of a terminal, e.g., a cellular phone. The terms "location" and "position" are synonymous and are used interchangeably herein. For example, an LCS client may desire to know the location of the terminal and may communicate with a location center in order to request the location of the terminal. The location center and the terminal may then exchange messages, as necessary and possibly in accordance with a positioning protocol, to obtain a position estimate for the terminal. The location center may then return the position estimate to the LCS client.

Several positioning protocols have been defined to support positioning of terminals. These positioning protocols include Radio Resource LCS Protocol (RRLP) and Radio Resource Control (RRC) defined by an organization named "3rd Generation Partnership Project" (3GPP) and C.S0022 (also known as IS-801) defined by an organization named "3rd Generation Partnership Project 2" (3GPP2). Each positioning protocol supports positioning of a wireless terminal that is communicating with either a specific wireless access type (e.g., GSM or WCDMA) or a wireless access type in a specific set of related wireless access types (e.g., CDMA2000 1XRTT and CDMA2000 EV-DO). For each positioning protocol, it may be difficult or not possible to use the procedures and positioning methods supported by that positioning protocol to locate a wireless terminal that is communicating with some other wireless access type. Multiple existing positioning protocols may be used to support positioning for different wireless access types. However, extensive implementation and testing may be required to deploy these positioning protocols. Further implementation and testing may also be needed to support new positioning protocols for new wireless access types.

SUMMARY

Techniques for efficiently supporting multiple positioning methods for different wireless access types are described herein. In an aspect, a generic positioning protocol (GPP) may be used to support satellite-based positioning methods and terrestrial-based positioning methods for different wireless and/or wireline access types. GPP may simplify implementation and improve interoperability and may also provide other advantages Improved interoperability may result in support of positioning for a greater number of terminals and a greater number of wireless networks using common means such as a common positioning protocol and a common location server.

In one design, a terminal may exchange a first GPP message comprising first information for a first positioning method and a first access type supported by a GPP. The GPP may support multiple positioning methods and at least three access types. The terminal may exchange a second GPP message comprising second information for the first positioning method and the first access type. For example, the terminal may receive the first GPP message comprising a request for location information from a location center and may send the second GPP message comprising the requested location information to the location center. Each GPP message may comprise at least one position element. Each position element may be for a specific positioning method and may carry information for the positioning method. The terminal or location center may obtain a position estimate for the terminal based on the second information.

In another aspect, positioning may be performed based on measurements for cells of different wireless access types. In one design, a terminal may obtain a first set of at least one received transmission time for at least one cell of a first wireless access type. The terminal may also obtain a second set of at least one received transmission time for at least one cell of a second wireless access type. The terminal may obtain at least one time difference between the first and second sets of at least one received transmission time. The terminal may obtain a position estimate for itself based on the at least one time difference.

In yet another aspect, received transmission times may be transformed to converted times based on common timing applicable for multiple wireless access types. This may allow received transmission times for different wireless access types to be used for positioning. The terminal may convert the first set of at least one received transmission time for the at least one cell of the first wireless access type based on the common timing and obtain a first set of at least one converted time. The terminal may also convert the second set of at least one received transmission time for the at least one cell of the second wireless access type based on the common timing and obtain a second set of at least one converted time. The terminal may use the converted times for positioning or may send the converted times to a location server, which may then derive the position estimate for the terminal based on the converted times.

Various aspects and features of the disclosure are described in further detail below.

BRIEF DESCRIPTION OF THE DRAWINGS

FIGS. 7 to 17 show exemplary message flows for GPP negotiation.

DETAILED DESCRIPTION

Figure 1:
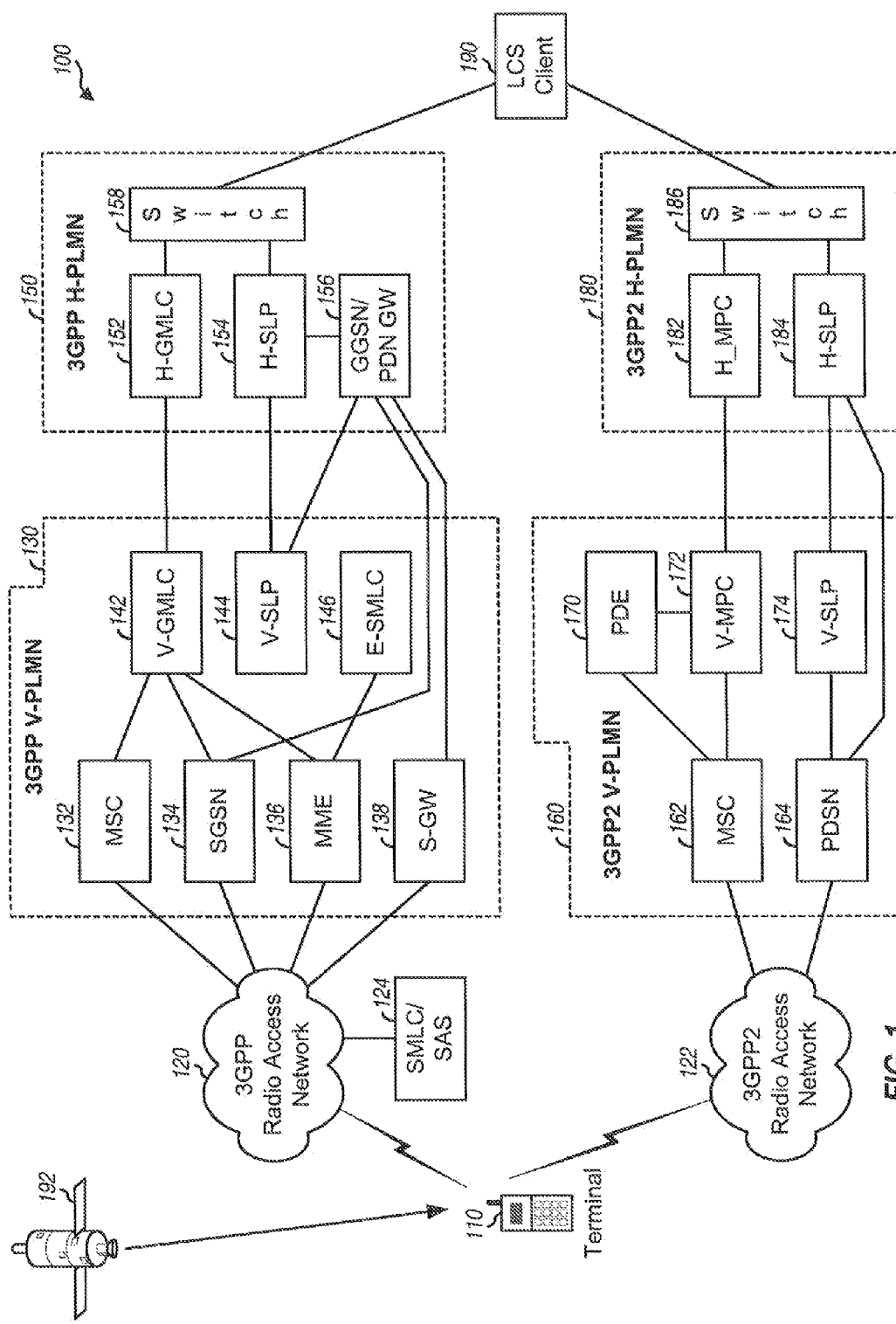
FIG. 1 shows an exemplary network deployment.

FIG. 1 shows an exemplary network deployment 100. A terminal 110 may communicate with a 3GPP RAN 120 or a 3GPP2 RAN 122 to obtain communication services. A RAN may also be referred to as an access network, a radio network, a wireless network, etc. RAN 120 may be a Global System for Mobile Communications (GSM) network, a Wideband Code Division Multiple Access (WCDMA), a General Packet Radio Service (GPRS) access network, a Long Term Evolution (LTE) network, etc. GSM, WCDMA and GPRS are part of Universal Mobile Telecommunications System (UMTS). LTE is part of 3GPP Evolved Packet System (EPS). RAN 122 may be a CDMA 1X network, a High Rate Packet Data (HRPD) network, an Ultra Mobile Broadband (UMB) network, etc. HRPD is also referred to as Evolution-Data Optimized (EV-DO). CDMA 1X and HRPD are part of cdma2000. In general, a RAN may support any wireless access type, with GSM, WCDMA, LTE, CDMA 1X, HRPD and UMB being some examples. Some other examples include WiMax defined by IEEE 802.16 family of standards and WiFi defined by IEEE 802.11 family of standards. Wireless access type may also be referred to as radio technology, radio access technology, air-link interface, etc.

Terminal 110 may be stationary or mobile and may also be referred to as a mobile station (MS) in GSM and CDMA 1X, a user equipment (UE) in WCDMA and LTE, an access terminal (AT) in HRPD, a SUPL enabled terminal (SET) in Secure User Plane Location (SUPL), a subscriber unit, a station, etc. Terminal 110 may be a cellular phone, a personal digital assistant (PDA), a wireless device, a wireless modem, a wireless router, a laptop computer, a telemetry device, a tracking device, etc. Terminal 110 may communicate with one or more base stations in RAN 120 or 122. Terminal 110 may also receive and measure signals from one or more satellites 192 and obtain pseudo-range measurements for the satellites. Terminal 110 may also measure signals from base stations in RAN 120 and/or RAN 122 and obtain timing measurements, signal strength measurements, and/or signal quality measurements for the base stations. The pseudo-range measurements, timing measurements, signal strength measurements, and/or signal quality measurements may be used to derive a position estimate for terminal 110. A position estimate may also be referred to as a location estimate, a position fix, etc.

Satellites 192 may be part of a Global Navigation Satellite System (GNSS), which may be the United States Global Positioning System (GPS), the European Galileo system, the Russian GLONASS system, or some other GNSS. A GNSS may also be referred to as a satellite positioning system (SPS) and typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipment and/or space vehicles. In a particular example, such transmitters may be located on Earth orbiting satellite vehicles (SVs). For example, a SV in a constellation of a GNSS such as GPS, Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). The techniques described herein may be used for global systems (e.g., GNSS) as well as (i) regional systems such as, e.g., Quasi-Zenith Satellite System (QZSS) over Japan, Indian Regional Navigational Satellite System (IRNSS) over India, Beidou over China, etc., and/or (ii) various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation, or GPS and Geo Augmented Navigation system (GAGAN), and/or the like. Thus, as used herein, a GNSS will be understood to also include any combination of one or more global and/or regional navigation satellite systems and/or augmentation systems, and GNSS signals may include GNSS, GNSS-like, and/or other signals associated with such one or more GNSS.

3GPP RAN 120 may couple to a Serving Mobile Location Center (SMLC)/Standalone SMLC (SAS) 124, which may support positioning for terminals communicating with RAN 120. SMLC 124 may support terminal-based, terminal-assisted, and network-based positioning methods. Positioning refers to a functionality that determines a geographical location of a target terminal.

3GPP RAN 120 may also communicate with a 3GPP Visited Public Land Mobile Network (V-PLMN) 130. V-PLMN 130 may include a Mobile Switching Center (MSC) 132, a Serving GPRS Support Node (SGSN) 134, a Mobility Management Entity (MME) 136, a Serving Gateway (S-GW) 138, a Visited Gateway Mobile Location Center (V-GMLC) 142, a Visited SUPL Location Platform (V-SLP) 144, and an Evolved SMLC (E-SMLC) 146. MSC 132 may perform switching functions for circuit-switched calls for terminals within its coverage area. SGSN 134 may perform switching and routing functions for packet-switched connections and sessions. MME 136 may perform various control functions such as mobility management, gateway selection, authentication, bearer management, etc. S-GW 138 may perform various functions related to Internet Protocol (IP) data transfer for terminals such as data routing and forwarding, mobility anchoring, etc. V-GMLC 142 may perform various functions to support location services, interface with external LCS clients, and provide services such as subscriber privacy, authorization, authentication, billing, etc. V-SLP 144 may include a SUPL Location Center (SLC) and possibly a SUPL Positioning Center (SPC). The SLC may perform various functions for location services, coordinate the operation of SUPL, and interact with SETs. The SPC may support positioning for SETs and delivery of assistance data to the SETs and may also be responsible for messages and procedures used for position calculation. E-SMLC 146 may support location services for terminals accessing LTE.

V-PLMN 130 may communicate with a Home PLMN (H-PLMN) 150 with which terminal 110 may have service subscription. H-PLMN 150 may include a Home GMLC (H-GMLC) 152, a Home SLP (H-SLP) 154, Gateway GPRS Support Node (GGSN)/Packet Data Network Gateway (PDN GW) 156, and a switch 158. Switch 158 may receive requests from LCS clients (e.g., an LCS client 190) and may route each request to either H-GMLC 152 or H-SLP 154 for processing. GGSN/PDN GW 156 may perform various functions such as maintenance of data connectivity for terminals, IP address allocation, etc.

SMLC/SAS 124, MSC 132, SGSN 134, MME 136, S-GW 138, V-GMLC 142, E-SMLC 146, H-GMLC 152, and GGSN/PDN GW 156 are network entities defined by 3GPP. V-SLP 144 and H-SLP 154 are network related entities defined by Open Mobile Alliance (OMA). GGSN/PDN GW 156 may be located in 3GPP H-PLMN 150 as shown in exemplary network deployment 100 or may be located in 3GPP V-PLMN 130 in an alternative network deployment.

3GPP2 RAN 122 may communicate with a 3GPP2 V-PLMN 160. V-PLMN 160 may include an MSC 162, a Packet Data Serving Node (PDSN) 164, a Position Determining Entity (PDE) 170, a Visited Mobile Positioning Center (V-MPC) 172, and a V-SLP 174. PDSN 164 may perform switching and routing functions for packet-switched connections and sessions. PDE 170 may support positioning for terminals communicating with V-PLMN 160. V-MPC 172 may perform various functions to support location services, interface with external LCS clients, and provide services such as subscriber privacy, authorization, authentication, billing, etc.

V-PLMN 160 may communicate with an H-PLMN 180. H-PLMN 180 may include an H-MPC 182, an H-SLP 184, and a switch 186. Switch 186 may receive requests from LCS clients (e.g., LCS client 190) and may route each request to either H-MPC 182 or H-SLP 184 for processing. MSC 162, PDSN 164, PDE 170, V-MPC 172, and H-MPC 182 are network entities defined by 3GPP2. V-SLP 174 and H-SLP 184 are network related entities defined by OMA.

FIG. 1 shows some network entities that may be included in each PLMN. Each PLMN may also include other network entities that can support other functions and services.

Positioning protocols may be used to coordinate and control positioning of terminals, which may be mobile and whose position may be required by LCS clients or users. A positioning protocol typically defines (i) procedures that may be executed by a terminal being positioned and a location server and (ii) communication or signaling between the terminal and the location server. The location server may coordinate and direct the procedures and may transfer pertinent information (e.g., a position estimate) from one entity to another entity. The location server may (i) reside in a home network or a visited network for the terminal or (ii) be remote from the terminal and may be accessible via a wireless and/or wireline networks, e.g., the Internet.

Some existing positioning protocols include RRLP, RRC and IS-801. These positioning protocols support two broad classes of positioning method: (i) satellite-based positioning methods such as GPS and assisted GPS (A-GPS) and (ii) terrestrial-based positioning methods utilizing observed time differences (OTDs) between pairs of base stations in a serving network. The OTD method for GSM is referred to as Enhanced Observed Time Difference (E-OTD), the OTD method for WCDMA is referred to as Observed Time Difference of Arrival (OTDOA), and the OTD method for cdma2000 is referred to as Advanced Forward Link Trilateration (A-FLT). Each positioning protocol may support one or more satellite-based positioning methods and one or more terrestrial-based positioning methods for a single wireless access type. For example, RRLP supports A-GPS and E-OTD for GSM and GPRS access, RRC supports A-GPS and OTDOA for WCDMA, and IS-801 supports A-GPS and A-FLT for cdma2000.

A-GPS support in existing positioning protocols may be similar. Thus, each existing positioning protocol may be able to support A-GPS in any RAN with limited changes. However, OTD support may be dissimilar in existing positioning protocols because assistance data and positioning measurements may be defined for a specific wireless access type and may not be usable to support OTD in other wireless access types. In particular, each existing positioning protocol has been developed to specifically address OTD for a specific wireless access type.

New wireless access types are continually developed and deployed. Some recently defined wireless access types include IEEE 802.16 (WiMax), IEEE 802.11 (WiFi), LTE, and UMB. A new positioning protocol may be defined for each new wireless access type in order to support positioning for terminals served by RANs of that wireless access type. However, each new positioning protocol may require significant effort and cost for standardization, implementation, testing and deployment.

In an aspect, a generic positioning protocol (GPP) may be used to support positioning methods such as A-GPS and OTD for different wireless access types. GPP may support existing positioning methods such as E-OTD, OTDOA, A-FLT, Enhanced Cell Identity (E-CID), etc. GPP may also support positioning for new wireless access types as they are developed. GPP may also be upgraded to support new positioning capabilities (e.g., for GLONASS, modernized GPS (mGPS), Quasi-Zenith Satellite System (QZSS), etc.) for all supported wireless access types. GPP may also support wireline access, e.g., nomadic IP access. GPP may either replace or augment existing positioning protocols such as RRLP, RRC and IS-801.

GPP may support user plane and control plane solutions. A user plane or control plane solution may include various network elements, interfaces, protocols, procedures, and messages to support location services and positioning. In a control plane solution, messages supporting location services and positioning may be carried as part of signaling transferred between network entities and between a network entity and a terminal, typically with network-specific protocols, interfaces, and signaling messages. In a user plane solution, messages supporting location services and positioning may be carried as part of data transfer between network entities and a terminal, typically with standard data protocols such as TCP and IP. In a control plane solution, a specific positioning protocol is typically used for each wireless access type. For example, RRLP may be used for GSM, RRC may be used for WCDMA, and IS-801 may be used for cdma2000. In a user plane solution, a positioning protocol may be used for more than one wireless access type but with some limitations. For example, in the SUPL user plane solution, RRLP may be used for GSM without limitations and for WCDMA to support A-GPS and A-GNSS but not to support OTDOA. In contrast, GPP may support positioning for multiple wireless access types and multiple location solutions without limitations. For example, GPP may support positioning for user plane solutions such as SUPL from OMA, X.S0024 from 3GPP2, and V1 and V2 from CDMA Development Group (CDG). GPP may also support positioning for control plane solutions such as 3GPP TS 23.271, TS 43.059, and TS 25.305 from 3GPP and IS-881 and X.S0002 from 3GPP2. GPP may also be transported by various protocols such as SUPL, RRC, GSM Radio Resource (RR), CDMA 1X Data Burst, HTTP, TCP/IP, etc.

GPP may support various positioning methods for terminals. GPP may include "internal" positioning methods, which are positioning methods designed for GPP and possibly standardized as part of GPP or as an extension to GPP. GPP may also include "external" positioning methods, which are positioning methods that may be developed by external sources and incorporated into GPP. GPP may support new positioning methods and new wireless access types through backward compatible evolution. GPP may operate with SUPL and other user plane and control plane solutions. GPP may incorporate existing positioning methods with little or no change. GPP may support existing generic capabilities such as assistance data, measurements, capability negotiation, etc. GPP may also support hybrid positioning, initial coarse location, etc.

In one design, positioning methods in GPP may be defined in a modular manner, separately and independently of each other. This may allow new positioning methods to be added and/or existing positioning methods to be enhanced without affecting GPP operation or other positioning methods. Rigid lockstep association between different positioning methods may be avoided.

Each positioning method may support terminal-assisted, terminal-based, and standalone modes when applicable. GPP may provide a common framework to support internal and external positioning methods with simpler implementation and may be flexible to allow for efficient implementation of each positioning method.

Figure 2:
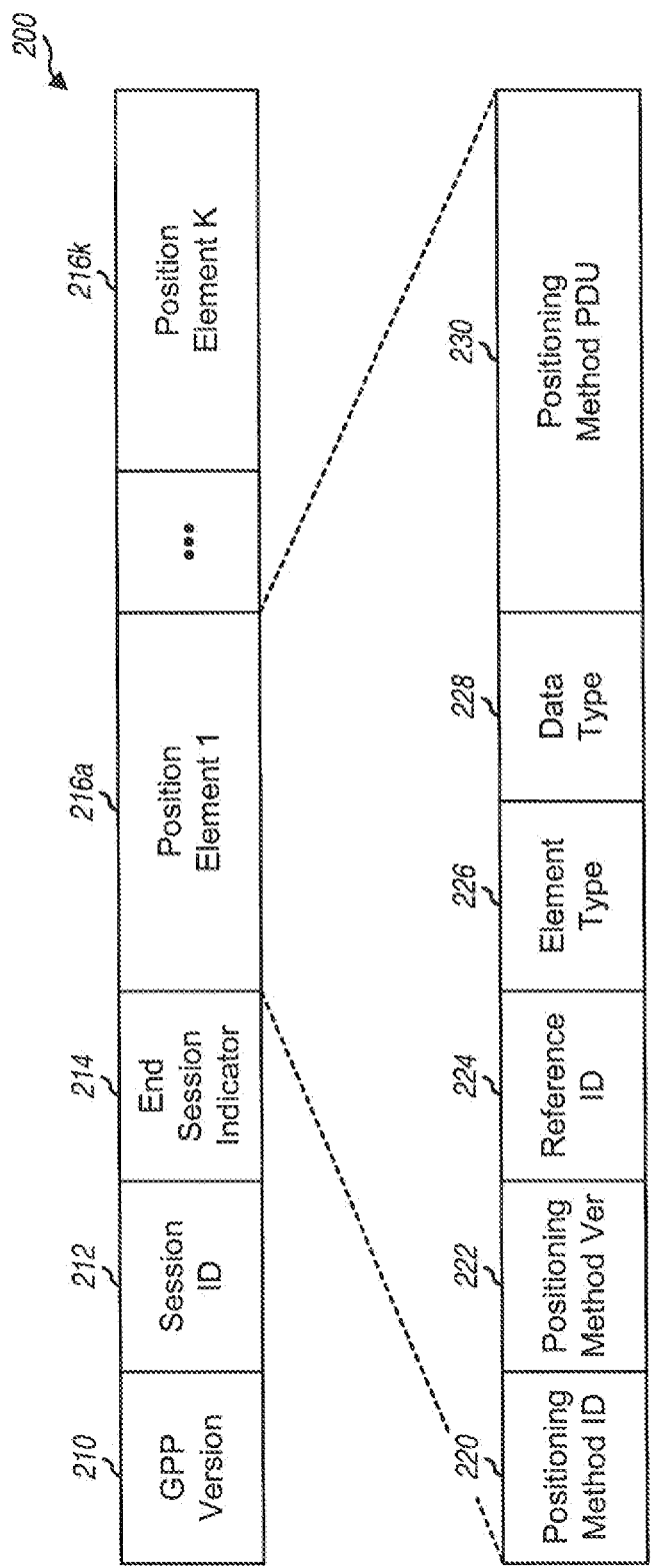
FIG. 2 shows an exemplary structure of a GPP message.

FIG. 2 shows an exemplary design of a structure/format of a GPP message 200. In this design, GPP message 200 may include a GPP version field 210, a session identifier (ID) field 212, an end session indicator field 214, and K position elements 216a through 216k, where K≥0. In general, a GPP message may include different and/or additional elements and fields for other information. ASN.1 and/or XML (extensible markup language) encoding may be used for the elements of GPP message 200.

GPP version field 210 may indicate which version of GPP is being used and may be included to negotiate use of the same GPP version by two entities engaging in a GPP session. An originating entity may set the GPP version to the highest version V that it supports in the first GPP message that it sends. A receiving entity may return the highest version U that it supports, subject to U≤V, in a GPP reply. The negotiated GPP version may be the lower of the two highest versions supported by the two entities. An entity that supports a new (higher) GPP version should also support all lower GPP versions to ensure backward compatibility with entities that only support lower versions. The GPP version may mainly indicate which positioning methods are supported, which may simplify support of lower versions.

The session ID may identify a GPP session. Each GPP session may be assigned a unique session ID. Multiple GPP sessions between two entities may be supported and may be identified by different session IDs. The session ID may also allow for detection of out-of-sync conditions, e.g., due to one entity aborting or losing a GPP session. A GPP session may also be continued if the transport level changes.

The end session indicator may indicate whether a sending entity has completed the GPP session. If so, then a receiving entity should not continue the GPP session and may start a new GPP session if the cause is not fatal.

FIG. 2 also shows a design of a structure of a position element 216 within GPP message 200. Position element 216 may include a positioning method ID field 220, a positioning method version (Ver) field 222, a reference ID field 224, an element type field 226, a data type field 228, and a positioning method protocol data unit (PDU) field 230. The positioning method ID may indicate a specific positioning method, e.g., A-GPS, E-OTD, OTDOA, A-FLT, etc. Future positioning methods may be easily added by assigning new positioning method IDs. Different categories of positioning methods may be distinguished by reserving different sets or ranges of positioning method ID values. These different categories may include (i) one or more categories for positioning methods defined by accredited national and international standards bodies (e.g., 3GPP, 3GPP2, IETF, IEEE, ITU, etc.) and (ii) one or more categories for positioning methods defined by non-standards organizations such as a particular wireless operator or wireless equipment manufacturer. The positioning method version may indicate the version of the positioning method and may be used for version negotiation. The reference ID may support association of requests and responses, e.g., a response to a request may include the same reference ID as the request.

The element type may indicate the purpose of the position element. Multiple classes may be supported, and a message in one class may invoke a response in the same class. For example, the element type may indicate whether the position element is for (i) a "request", a "last response", or "a not-last response" in a first class, (ii) a "provide" or an "acknowledgement" in a second class, or (iii) an "abort/error" in a third class. For the first class, a "last response" or a "not-last response" may be sent only in reply to a "request". When a response is segmented, a "last response" may be preceded by one or more instances of "not-last response" to support segmentation. For the second class, a "provide" may optionally request an "acknowledgment" in response. With segmentation, multiple instances of "provide" may be sent, e.g., with an "acknowledgment" sent for each "provide" or for only the last "provide". For the third class, an "abort/error" may be sent in place of a "last response", a "not-last response", or an "acknowledgment". The data type may indicate the type of information being sent in the position element, e.g., assistance data, location information (e.g., measurements, position estimate, etc.), capabilities for the positioning method, error information, etc. In one design, only one type of data may be sent in each position element. The positioning method PDU may contain data that is specific to the element type, data type, and positioning method.

GPP may support internal, external, and common positioning methods. Internal positioning methods may be defined exclusively for and in association with GPP, e.g., may be defined by the same organization such as a standards development organization (SDO) that defines or owns the definition of GPP. A particular GPP version V may define which version P of an internal positioning method should be used. A version later than P may be valid in a GPP version later than V. Versions earlier than P may continue to be valid in GPP version V if allowed for the positioning method. Internal positioning methods may be suitable for positioning methods covering multiple wireless access types (e.g., A-GPS, A-GNSS, etc.), new positioning methods, etc.

External positioning methods may be defined for use with GPP and possibly other positioning protocols. The external positioning methods may exploit the structure of the position element and may include additional element types and/or data types not defined for GPP. Source definition of an external positioning method (e.g., message and parameter tables, ASN.1, XML, procedures, etc.) may be created by an organization such as a national or international SDO that does not define or own the definition of GPP. A definition of how an external positioning method can be used with GPP (e.g., including a definition of the positioning method ID, positioning method PDU contents, positioning method element types, and positioning method data types in the GPP position element structure) may be accomplished by showing the correspondence between these GPP components and equivalent components defined for the external positioning method. This mapping process may be assisted by employing suitable references, e.g., to ASN.1 and XML data types defined for the external positioning method. For a particular GPP version V, the mapping may be defined for (i) only one particular external positioning method version U, which may mean that GPP version V can only be used with version U of the external positioning method, or (ii) for versions of the external positioning method earlier than U and/or later than U. External positioning methods may be suitable for positioning methods developed for specific wireless access types or a family of related wireless access types. External positioning methods may also be suitable for existing positioning methods not expected to change much, e.g., E-OTD, AFLT, A-GPS, etc.

Common positioning methods (CPMs) may be used to augment other positioning methods and may have their own positioning method IDs. CPM position elements in a GPP message may be used in the following ways. A CPM Capabilities PDU (i.e., a CPM position element with a data type indicating capabilities) may indicate (i) which other positioning methods are supported by a device, e.g., via a list of positioning method IDs, and (ii) other common capabilities of a device, e.g., the maximum number of simultaneous positioning method invocations that can be supported by the device. A CPM Assistance Data PDU (i.e., a CPM position element with a data type indicating assistance data) may convey generic assistance data to a terminal, e.g., approximate location of the terminal, approximate absolute time, etc. A CPM Location Information PDU (i.e., a CPM position element with a data type indicating location information) may convey location information obtained by a terminal using its own resources, e.g., a standalone position estimate, velocity, acceleration, sensor measurements, relative change in the position estimate, etc. This CPM PDU may also convey terminal-based positioning results for one or more other positioning methods, e.g., where the terminal obtained a position estimate itself using some other terminal-based positioning method. This CPM PDU may avoid the need to support separate terminal-based location request and terminal-based location response for GPP position elements for other positioning methods. The capabilities, assistance data, and location information that are specific to other positioning methods may still be supported within those positioning methods and may not be covered by CPM. New positioning methods may also be developed to support various wireless access types.

Figure 3:
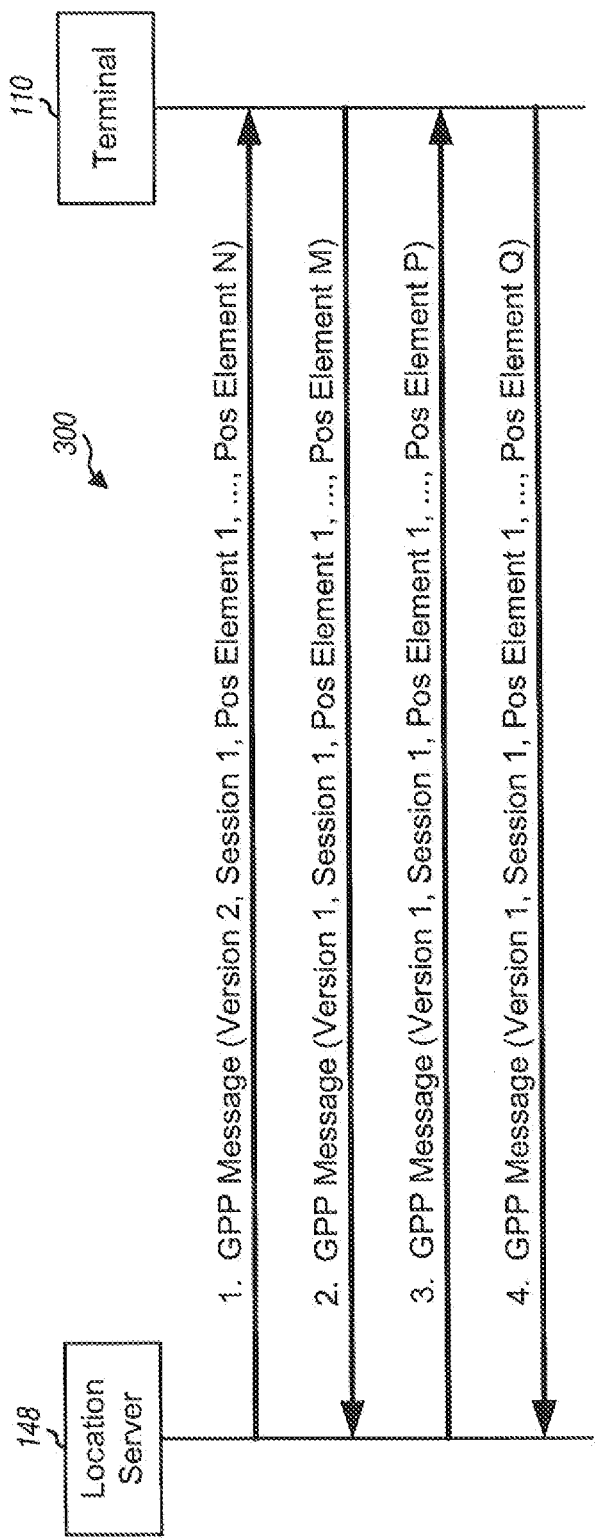
FIGS. 3, 4 and 5 show exemplary message flows for GPP sessions.

FIG. 3 shows a design of a message flow 300 for a GPP session. A location server 148, which may be any of the SLPs, GMLCs, and MPCs in FIG. 1, may send a GPP message with GPP version 2, a session ID 1, and N position elements to terminal 110, where N≥1. Terminal 110 may support GPP version 1 but not GPP version 2 and may respond by sending a GPP message with GPP version 1, session ID 1, and M position elements, where M≥1. Location server 148 may select the lower GPP version 1 and may send a GPP message with GPP version 1, session ID 1, and P position elements, where P≥1. Terminal 110 may respond with a GPP message with GPP version 1, the "end session indicator" set, and Q position elements, where Q≥1. The position element(s) in each GPP message may carry any information used for a positioning method.

Figure 4:
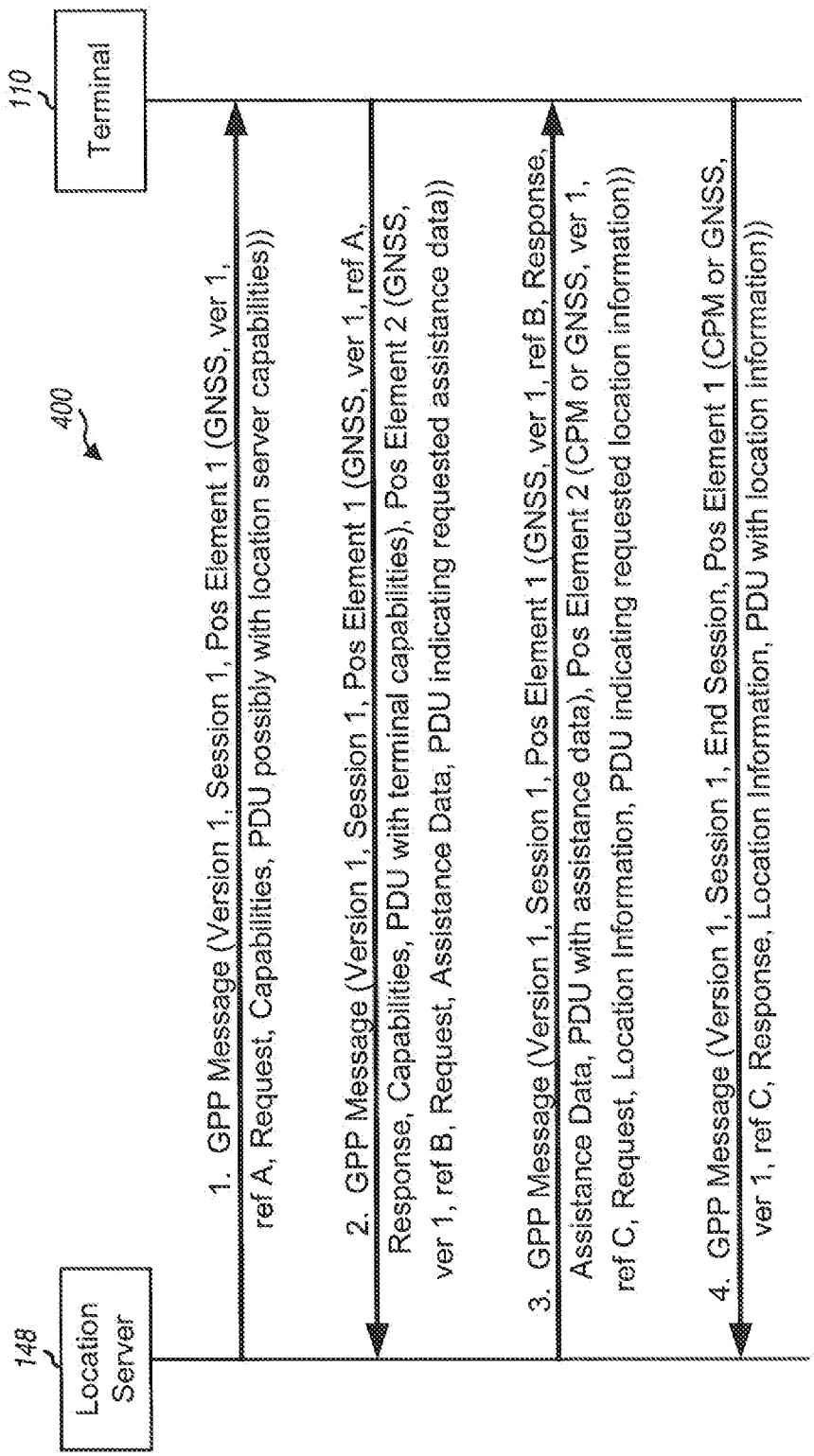

FIG. 4 shows a design of a message flow 400 for a GPP session with an internal GNSS positioning method. Location server 148 may send a GPP message with GPP version 1, session ID 1, and one position element to terminal 110. This position element may indicate GNSS positioning method with version 1 and may have the reference ID set to A, the element type set to "request", and the data type set to "capabilities". The position element may carry a PDU possibly with the capabilities of location server 148. Terminal 110 may support version 1 of the GNSS positioning method and may then respond by sending a GPP message with GPP version 1, session ID 1, and two position elements. The first position element may respond to the position element included in the prior GPP message sent by location server 148 and may include the terminal capabilities for the GNSS positioning method. The second position element may request assistance data for the GNSS positioning method. Location server 148 may then send a GPP message with GPP version 1, session ID 1, and two position elements. The first position element may include the GNSS assistance data requested by terminal 110 in the prior GPP message. The second position element may request for location information obtained using the GNSS positioning method. Terminal 110 may respond by sending a GPP message with GPP version 1, session ID 1, the "end session indicator" set, and one position element. This position element may include the GNSS location information (e.g., GNSS satellite measurements) requested by location server 148 in the prior GPP message.

Figure 5:
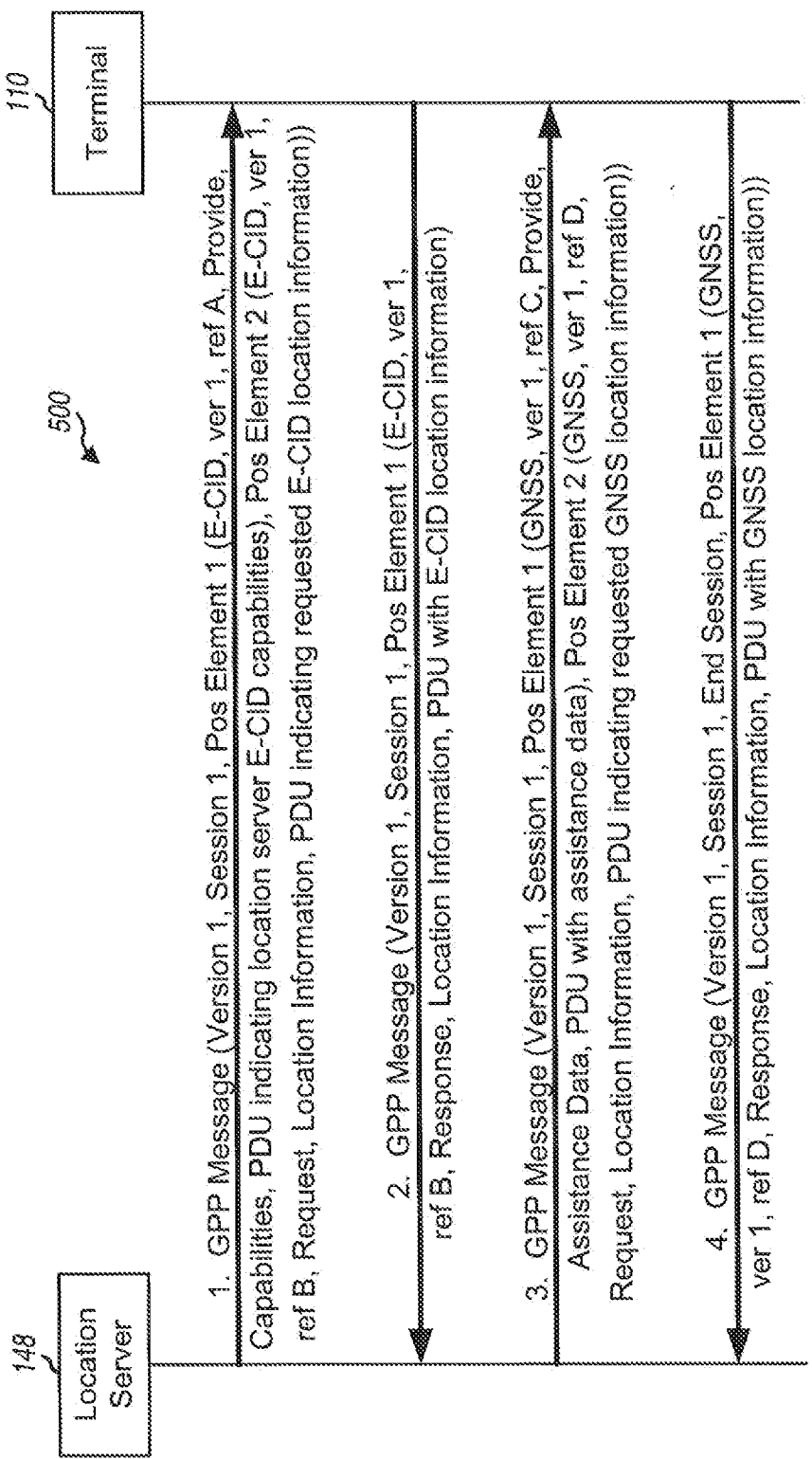

FIG. 5 shows a design of a message flow 500 for a GPP session with internal GNSS and E-CID positioning methods. The GPP session obtains an initial coarse location for a terminal using E-CID and a later accurate location for the terminal using GNSS. Location server 148 may send a GPP message with GPP version 1, session ID 1, and two position elements to terminal 110. The first position element may indicate E-CID positioning method with version 1 and may provide E-CID capabilities of location server 148. The second position element may request for location information for E-CID. Terminal 110 may respond by sending a GPP message with GPP version 1, session ID 1, and one position element containing the requested location information for E-CID (e.g., signal measurements of nearby base stations). Location server 148 may then send a GPP message with GPP version 1, session ID 1, and two position elements. The first position element may indicate GNSS positioning method with version 1 and may provide GNSS assistance data. The second position element may request for location information for the GNSS positioning method. Terminal 110 may respond by sending a GPP message with GPP version 1, session ID 1, the "end session indicator" set, and one position element. This position element may include the location information requested by location server 148 in the prior GPP message obtained using the GNSS positioning method.

An E-CID positioning method may enable a location server to request and a terminal to provide measurement information associated with visible base stations. The E-CID capabilities sent by the location server may inform the terminal of information that the location server prefers to receive (e.g., particular types of signal measurement). The E-CID capabilities sent by the terminal may inform the location server of E-CID related information that the terminal can provide.

A GNSS positioning method may support all types of GNSS including legacy GPS L1C/A, GLONASS, Galileo, modernized GPS (mGPS), QZSS, EGNOS, WAAS, etc. The GNSS positioning method in GPP may be the same as or based on the GNSS positioning method in RRLP, RRC or IS-801.

I. Hybrid & Generic OTD—Generic Fine Time Assistance (FTA)

A base station in a RAN may support one or more cells or sectors. In 3GPP, the term "cell" can refer to a coverage area of a base station or a base station subsystem serving the coverage area, depending on the context in which the term is used. In 3GPP2, the term "sector" or "cell-sector" can refer to a coverage area of a base station or a base station subsystem serving the coverage area. For clarity, 3GPP concept of cell is used in the description below.

In another aspect, hybrid OTD positioning may be used to derive a position estimate for a terminal based on OTDs between cells of different wireless access types, e.g., between GSM and WCDMA cells, between CDMA 1X or HRPD cells and GSM or WCDMA cells, etc. Hybrid OTD positioning may increase the number of cells between which OTDs can be measured by a terminal in comparison to OTD methods such as E-OTD, OTDOA and A-FLT, which are restricted to measuring OTDs between cells of one specific wireless access type. Measuring OTDs between more cells may increase accuracy and reliability and may also reduce response time since it may no longer be necessary to spend time searching for and measuring signals from far away cells.

Cells of different wireless access types typically use dissimilar transmission timing. Each positioning protocol (e.g., RRLP, RRC or IS-801) may then define OTD measurements and OTD assistance data based on the transmission timing for the wireless access type supported by that positioning protocol. For example, RRLP defines OTD measurements based on GSM time units, which include frame number and bit number that do not apply to other wireless access types.

GPP may support hybrid OTD for a combination of wireless access types as well as generic OTD for different wireless access types in several manners. In one design, time measurements for cells of different wireless access types may be aligned to a common time instant at terminal 110. Terminal 110 may obtain a set of received transmission times for cells in one or more RANs. Each received transmission time may indicate a particular transmission signal that was received by terminal 110 at the common time instant. For example, for GSM, each received transmission time may provide a GSM frame number, a bit number, and a fraction of a bit that terminal 110 had just received. The set of received transmission times may be given as $\{T_1, T_2, \ldots, T_K\}$, where $T_k$ is the received transmission time for cell k, with $1 \leq k \leq K$. $T_k$ may be expressed in transmission units (e.g., GSM frames and bits) applicable to cell k. The received transmission times for all cells may be aligned to a common time instant T at terminal 110. For example, terminal 110 may measure a received transmission time of $T_{kx}$ for cell k at time $T_x$ of terminal 110. Terminal 110 may then add a time difference of $(T-T_x)$, expressed in the time units used for the wireless access type supported by cell k, to the measured transmission time $T_{kx}$ to obtain the received transmission time $T_k$ for cell k at time T of terminal 110.

Terminal 110 may also obtain received transmission times for different cells at the common time instant T in other manners. For example, terminal 110 may measure several received transmission times for a cell and may perform extrapolation or interpolation to obtain a received transmission time for the cell at time T. In general, terminal 110 may perform extrapolation, interpolation, or simple correction of one transmission time measurement based on absolute or reference timing, which may be provided by any continuous time base. For example, the absolute timing may be provided by an internal clock at terminal 110, an external clock provided by a base station or a satellite, an internal clock that is locked to an external clock source, etc.

In a first design, the received transmission times for cells of each wireless access type may be given in time units for that wireless access type. For example, received transmission time $T_k$ for GSM cell k may be given by a GSM frame number, a bit number, and a fraction of a bit.

The set of received transmission times $\{T_1, T_2, \ldots, T_K\}$ may be transferred to a location server. Each transmission time may be expressed using the time unit applicable for the associated wireless access type. GPP may then provide different types of parameter to convey the received transmission times of each wireless access type. To support a new wireless access type by GPP, a new type of parameter may be added to the GPP definition to convey the new type of wireless transmission timing. A location server may obtain the real (or absolute) time differences (RTDs) between different base stations using fixed location measurement units (LMUs) at known locations. The LMUs may measure and provide OTDs to the location server from which RTDs can be calculated. The location server may use the OTDs and RTDs to compute the position of terminal 110 using the known locations of the base stations. The location server may also obtain RTDs and locations of base stations in other ways from the OTDs provided by terminals.

In a second design, the set of received transmission times $\{T_1, T_2, \ldots, T_K\}$ may be sent by terminal 110 to a network server in some common form. For example, each received transmission time may be converted into a transmission time based on a common unit of time (e.g., seconds).

Obtaining meaningful OTDs between received transmission times for cells of different wireless access types may not be directly possible for wireless access types that support different units of transmission timing and have different cyclic periods because the RTDs will not be constant. However, constant RTDs and meaningful OTDs may be obtained by converting the transmission timing of each cell to a new converted timing that employs both a time unit and a cyclic period that is common to all wireless access types. This conversion may be performed as follows.

Step 1: Choose a common time unit U and a common cyclic period T that may be appropriate for different time units and different cyclic periods of all wireless access types to be converted. Use the common time unit to express all measurements of time, e.g., converted time, real cell timing, and absolute time. This may be a simple transformation. For example, transmission time for GSM may be expressed as a number x of GSM frames plus a number y of GSM bits. The transformation to a common time unit z may be accomplished by computing (xF+yB), where F is GSM frame duration in units of z, and B is GSM bit duration in units of z.

Step 2: Align the real timing of each cell with the intended converted timing for the cell by associating a real time R for the cell with a particular converted time C for the cell at some precise or estimated value A of absolute time (e.g., estimated based on GPS or based on absolute time information conveyed by a particular cell transmission).

Step 3: For any real cell time R* subsequent to R, calculate a converted time C* for real time R* as C*=C+(R*−R). Converted time C* is a representation of the real time R* based on the common time unit and the common cyclic period. The calculation includes the effects of different cyclic periods for the real time and the converted time, as described below.

Figure 6:
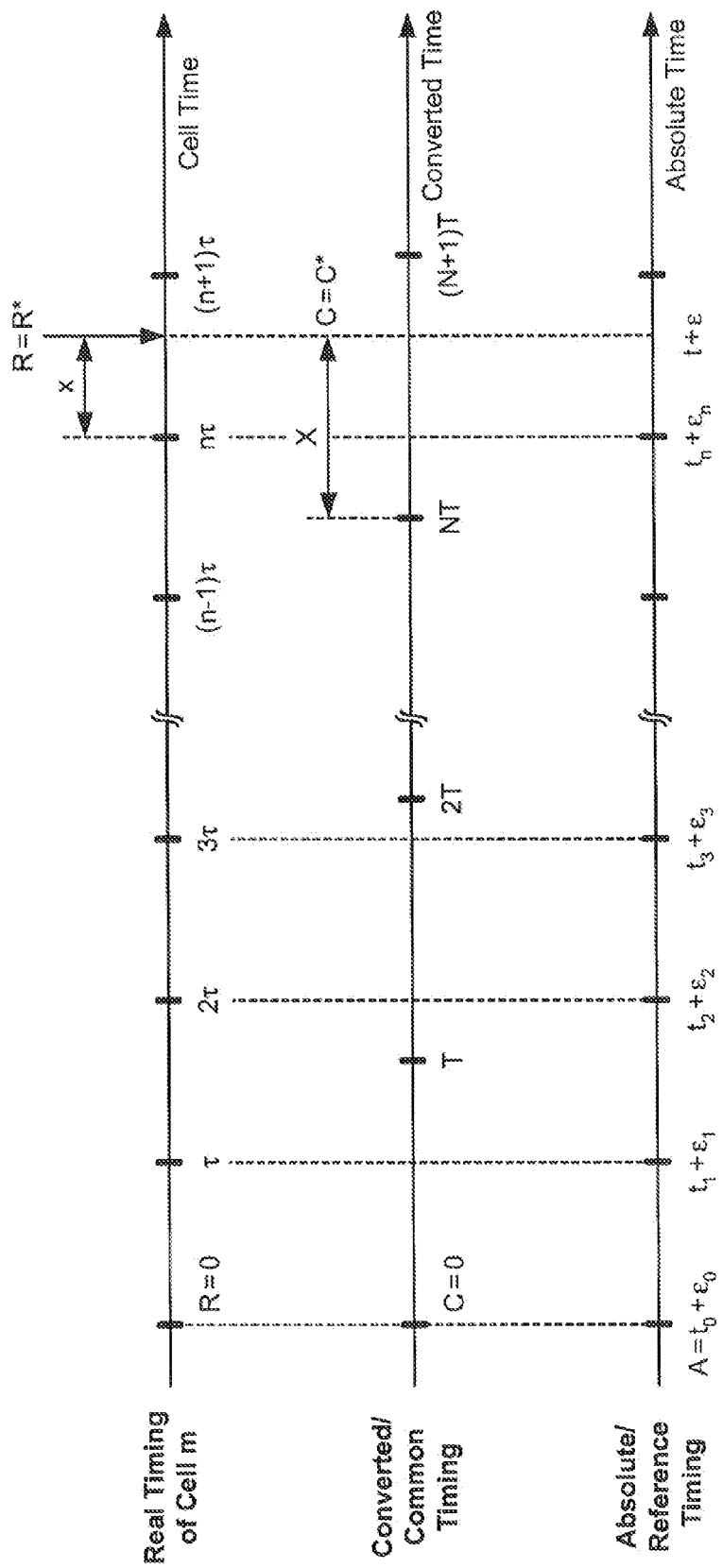
FIG. 6 shows conversion of a received transmission time to a converted time.

FIG. 6 shows conversion of real time to converted time for one cell k in accordance with the steps described above. The real timing of cell k has a cyclic period of $\tau$, which may be any time duration and may be dependent on the wireless access type. The converted/common timing has a cyclic period of T, which may be longer than t (as shown in FIG. 6) or shorter than $\tau$. For simplicity, FIG. 6 assumes that in step 2, real time R=0 is associated with common time C=0 (i.e., C=0 and R=0 coincide in step 2) at absolute time $A=t_0+\epsilon_0$. The absolute time at each successive cyclic period (nτ) of the real timing may be represented as $t_n+\epsilon_n$, where $t_n$ is the estimated absolute time at real time (nτ) (i.e., at the start of the (n+1)-th cyclic period of the real timing), and $\epsilon_n$ is an error in $t_n$ (e.g., in estimation of $t_n$ by the location server or terminal 110).

Real time R* may occur at any time after real time R and may be given in terms of the real timing as R*=n·τ+x, where n is an integer portion (in number of cyclic periods of the real timing) and x is a fractional portion ($0 \leq x < \tau$). Real time R* may occur at absolute time t+ϵ, where t is the estimated absolute time of real time R* (e.g., as seen by terminal 110 or the location server) and ϵ is an error in t (e.g., in estimation of t by terminal 110 or the location server). Converted time C* corresponding to real time R* may be given in terms of the common timing as C*=N·T+X, where N is the integer portion (in number of cyclic periods of the common timing) and X is the fractional portion (0≤X<T). Step 3 finds the converted time parameters N and X corresponding to real time R*.

Real time R* may be expressed as:

$$R^* = n\cdot\tau + x = N\cdot T + X = (t+\epsilon) - (t_0 + \epsilon_0). \qquad \text{Eq (1)}$$

The integer and fractional components of the converted time may be given as:

$$N = \left\lfloor \frac{n\cdot\tau + x}{T} \right\rfloor, \text{ and} \qquad \text{Eq (2)}$$

$$X = (n\cdot\tau + x) - N\cdot T. \qquad \text{Eq (3)}$$

Integer component n may not be known (e.g., may not be directly observed) due to the cyclic nature of the real timing. However, n may be obtained from the estimated absolute time t at real time R*, as follows:

$$n = \text{Round}\{[(t-t_0)+(\epsilon-\epsilon_0)-x]/\tau\}. \qquad \text{Eq (4)}$$

The rounding in equation (4) is to the nearest integer.

If |(ϵ−ϵ₀)|<τ/2, then a correct value of n may be obtained by assuming (ϵ−ϵ₀)=0 in equation (4). This may be ensured for any real timing with a cyclic period τ that significantly exceeds estimation errors for absolute time. The absolute time may thus allow terminal 110 to determine the integer portion n of real time R* at the time the fractional portion x is obtained. The converted time parameters N and T may then be obtained using equations (2) and (3).

The common timing may be defined based on a suitable time unit U and a cyclic period T, which may be equal to some integer number of time units U. The common timing is not maintained by terminal 110 or a location server in the sense of having some internal clock. Terminal 110 may measure real time for each cell (e.g., using absolute time to assist this measurement). Terminal 110 or the location server may convert the real cell time to a converted time that may be expressed in time units U of the common timing.

Fixing the association between the real timing and the converted timing in accordance with equations (2) and (3) may mean that any drift in the real timing (e.g., where the actual cyclic period is slightly more than or less than the defined value τ) will also be reflected in the converted timing (e.g., resulting in a converted cyclic period that is slightly more than or less than the defined value T). Since absolute time will not drift, using equation (4) to obtain the value of n may introduce an error once the cumulative drift of real cell time begins to approach τ/2. To avoid this, the association of absolute timing A to real timing R may be periodically re-estimated by obtaining a new value for the absolute time A in step 2 corresponding to the latest value for the real time R and the associated latest value for the converted time C.

Real time R* for one cell k may be measured and transformed into converted time C* (or N and X), as described above. Real times for a set of cells may be measured at the same time instant by terminal 110 and transformed to converted times in similar manner. The converted times may be used to obtain OTDs or RTDs between cells of the same or different wireless access types. In particular, because converted times share the same time unit and the same cyclic period T, the OTDs and RTDs may not change over time except due to timing drift or change in the location of any terminal measuring these. These OTDs and RTDs may then be used to estimate location in the same manner as OTDs and RTDs obtained for cells of the same wireless access type.

For a location server that supports multiple LMUs and terminals, the alignment in step 2 should be the same for all terminals and LMUs in order to obtain consistent OTDs and RTDs from different terminals and LMUs. This may be achieved if the location server performs the conversions because it can use the same alignment in step 2 for each cell. If the terminals and LMUs perform the conversions, then the location server may inform each terminal and each LMU what alignment to use (e.g., by providing the values of R, C and A for each cell). Alternatively, the terminal or LMU may inform the location server which alignment the terminal or LMU had used, which may then allow the location server to adjust the converted times or the OTDs that it receives from the terminal or LMU to the alignment used by the location server. In one design, a fixed convention may be defined for each wireless access type that would define the values of R, C, and A and thereby avoid having to communicate them. To allow for periodic alignment in step 2 to avoid errors introduced by cell timing drift as described above, the convention may define a sequence of absolute times A1, A2, A3, etc. (e.g., at intervals of one hour) at which the common time C restarts at zero. The real cell timing $R_k$ at each absolute time $A_k$ may then be measured or calculated from knowledge of the current cell time and current absolute time. With this convention, a terminal or LMU providing OTDs or converted times to a location server may just indicate the absolute Ak for which alignment had occurred if there was some ambiguity in this (e.g., at a time just after an absolute time boundary) but not otherwise.

In another design, terminal 110 may obtain a set of received transmission times $\{T_1, T_2, \ldots, T_K\}$ for cells $\{1, 2, 3, \ldots, K\}$ of one or more wireless access types. These received transmission times may not be converted to a common time and common cyclic period as described above. Terminal 110 may also obtain time drift rates $\{R_1, R_2, \ldots, R_K\}$ for the cells, as seen at the terminal location and as defined for each wireless access type. $R_k$ is the timing drift rate of a signal associated with cell k relative to some other signal or a time source with no drift, such as GPS. Terminal 110 may also obtain accuracy information, e.g., error standard deviations $\{S_1, S_2, \ldots, S_K\}$, where $S_k$ is the standard deviation of the error in $T_k$.

Terminal 110 may send the received transmission times (and possibly the time drift rates and/or accuracy information) to the location server. For the first design described above, each received transmission time may be expressed using the time units applicable for the associated wireless access type. GPP may support different time units for different wireless access types, and new time units may be defined as needed for new wireless access types. For the second design described above, each received transmission time may be expressed using the common time unit and common cyclic period applicable for all or many wireless access types. For the GPP message format shown in FIG. 2, terminal 110 may generate one or more location information PDUs, which may carry time elements for GNSS times and for cells of one or more wireless access types. Each cell time element may include a cell ID, the received transmission time $T_k$, the time accuracy $S_k$, etc. Terminal 110 may send the location information PDUs to the location server.

The location server may derive OTDs between different cells based on the received transmission times for these cells. If terminal 110 provides received transmission times according to each wireless access technology, then the location server may convert the received transmission times as described above. The location server may also obtain OTDs measured by LMUs at known fixed locations and may calculate RTDs between different cells using the OTDs from the LMUs. The location server may compute a position estimate for terminal 110 based on the OTDs and RTDs and the known locations of the cells. The location server may also obtain the RTDs and locations of the cells in other manners, e.g., based on OTDs received from various terminals.

II. Generic Positioning Module

In another aspect, a generic positioning module (GPM) may be defined for each distinct positioning method as a set of parameters supporting that positioning method. A GPM may contain signaling information used to support a positioning method and may be incorporated by any positioning protocol, e.g., incorporated by RRLP, RRC and IS-801-B, to support the positioning method. The same signaling information may be used to support the positioning method across different positioning protocols and may be generic. This may enable new positioning methods to be supported using existing positioning protocols and with common signaling impacts. A new GPP may also be created from a set of GPMs added to existing positioning protocols (to support all the positioning methods defined by these GPMs).

A common GPM structure may be defined for all GPMs to simplify creation of new GPMs. The common GPM structure may be the same as or similar to the GPP position element shown in FIG. 2 and may include the fields shown in FIG. 2. The reference ID and element type may be omitted for positioning protocols such as RRLP and RRC whose message types generally match element type. The GPM element type may thus be inferred from the RRLP or RRC message type. For example, an RRLP Measure Position Request may correspond to a Request GPM element. Defining a GPM using a GPP position element may allow the GPM to be used in both existing positioning protocols as well as GPP.

A new parameter may be added to existing messages in RRLP, RRC, IS-801, etc., to contain a GPM to support a particular positioning method. The content of this added GPM parameter may include a positioning method ID, a positioning method version, a data type, and a positioning method PDU. The GPM parameter may be optional in each message in which it is added and may be repeated in the message in order to support multiple positioning methods.

III. GPP Positioning for SUPL

GPP may be used to support positioning for SUPL. SUPL 2.0 is currently defined, and a new version of SUPL (e.g., SUPL 3.0) may be defined. GPP may be supported by SUPL 2.0 as follows. In a first design, a new positioning method indicator may be defined before SUPL 2.0 becomes an OMA enabler release in order to explicitly define later use of GPP. In another design, SUPL 2.0 may negotiate the use of either RRLP or IS-801. GPP may then be embedded in RRLP or IS-801 and may be negotiated as described below. An H-SLP may determine probable terminal support for GPP from its own data. For example, the H-SLP may know the terminal capabilities or may record GPP support from a previous SUPL session.

IV. GPP Positioning for GSM and GPRS Control Plane Solutions

GPP may be used to support positioning for a control plane solution in GSM. GPP may be used for mobile-terminated location request (MT-LR), mobile-originated location request (MO-LR), and network-initiated location request (NI-LR). For GSM control plane, RRLP messages may be transported inside Base Station System Location Services Assistance Protocol (BSSLAP) and RR messages, which may be exchanged between a terminal and an SMLC transparently to a base station. In one design, a GPP message may be substituted for an RRLP message and may then be transparent to the base station. In another design, a GPP message may be encapsulated inside an RRLP message, e.g., a new RRLP container component message used to encapsulate GPP messages. GPP may be supported in GSM control plane in various manners.

FIG. 7 shows a design of a message flow 700 for GPP negotiation using an existing RRLP capability transfer procedure for GSM control plane. If terminal 110 supports GPP, then it may indicate support of RRLP capability transfer via an MS Classmark 3 sent to a base station controller (BSC) 126 within RAN 120. BSC 126 may send a Base Station System Application Part—Location Services Extension (BSSAP-LE) Perform Location Request (PLR) message carrying the MS Classmark 3 for terminal 110 to SMLC 124. If SMLC 124 supports GPP, then it may include a GPP message in the first RRLP Positioning Capability Request message sent to terminal 110. This GPP message may be carried as an extension to the PosCapability-Req information element (IE). If terminal 110 does not support GPP, then it may ignore the received GPP message and return a normal RRLP Positioning Capability Response message to SMLC 124 (not shown in FIG. 7). SMLC 124 and terminal 110 may then continue with RRLP but not GPP. If terminal 110 does support GPP, then it may include a GPP message in a response sent to SMLC 124. This response may be (i) an RRLP Positioning Capability Response message, e.g., with a mandatory PosCapabilities IE included but empty, or (ii) a RRLP container message. Terminal 110 and SMLC 124 may negotiate GPP capabilities, request for assistance data, convey assistance data, etc., via the initial GPP messages exchanged between these entities. Terminal 110 and SMLC 124 may then continue with GPP, with GPP messages being sent either un-encapsulated or encapsulated in RRLP container messages.

FIG. 8 shows a design of a message flow 800 for GPP negotiation using MS Classmark 3 for GSM control plane. A new flag may be added to MS Classmark 3 to indicate that terminal 110 supports of GPP. SMLC 124 may send a GPP message to terminal 110 in the first positioning message, e.g., a RRLP container message. RRLP transfer may be used for the first positioning message since terminal 110 may not know whether SMLC 124 supports GPP. After the first positioning message, terminal 110 and SMLC 124 may exchange GPP messages either un-encapsulated or encapsulated in RRLP container messages.

Figure 9:
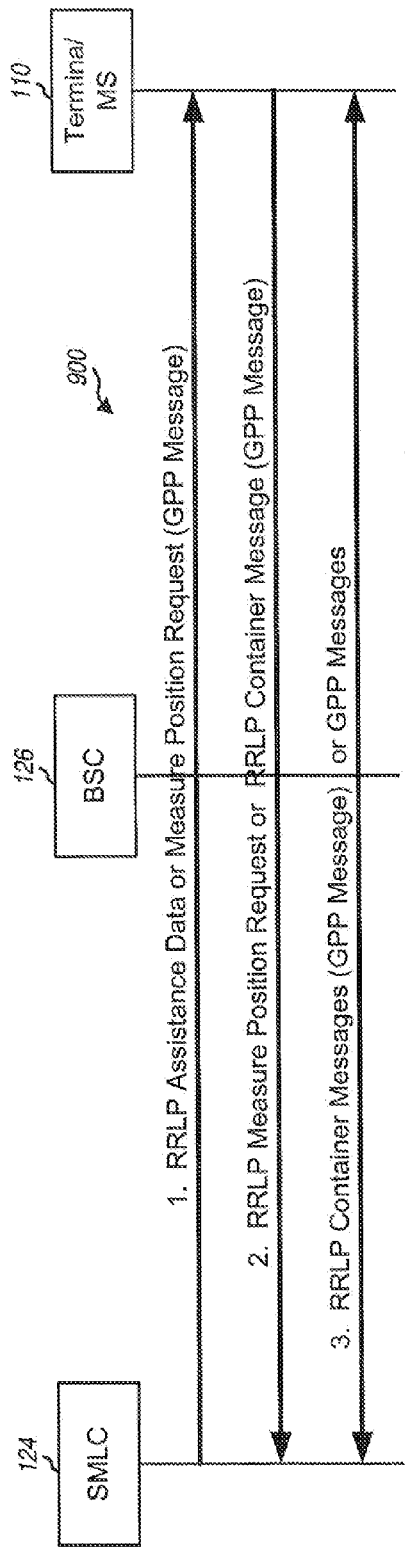

FIG. 9 shows a design of a message flow 900 for GPP negotiation using other RRLP messages for GSM control plane. A GPP message may be added as a new optional parameter in an RRLP message, e.g., an RRLP Measure Position Request message, an RRLP Assistance Data message, etc. SMLC 124 may start an RRLP session by sending an RRLP message (e.g., an RRLP Assistance Data message with limited assistance data) carrying a GPP message to terminal 110. If terminal 110 supports GPP, then it may return an RRLP message (e.g., an RRLP container message) carrying a GPP message. Terminal 110 and SMLC 124 may then exchange GPP messages either un-encapsulated or encapsulated in RRLP container messages.

The designs in FIGS. 7 to 9 may be supported by terminal 110 and SMLC 124. Other network entities such as BSCs and MSCs may not be impacted by GPP via GSM control plane.

In one design, GPP positioning methods may be used instead of RRLP positioning methods. In this design, RRLP may be used to negotiate and convey GPP, and a GPP positioning method may be performed thereafter, e.g., as shown in FIGS. 7 to 9. In another design, GPP positioning methods (e.g., with new capabilities) may be used in combination with RRLP positioning methods. GPP messages may be carried inside existing RRLP messages and/or RRLP container messages. Terminal 110 and SMLC 124 may interact differently depending on the positioning method being performed, with GPP interactions being applicable for GPP positioning methods, and RRLP interactions being applicable for RRLP positioning methods. Terminal 110 and SMLC 124 may exchange RRLP messages for both GPP and RRLP positioning methods. GPP messages may be carried inside RRLP messages for GPP positioning methods.

Figure 10:
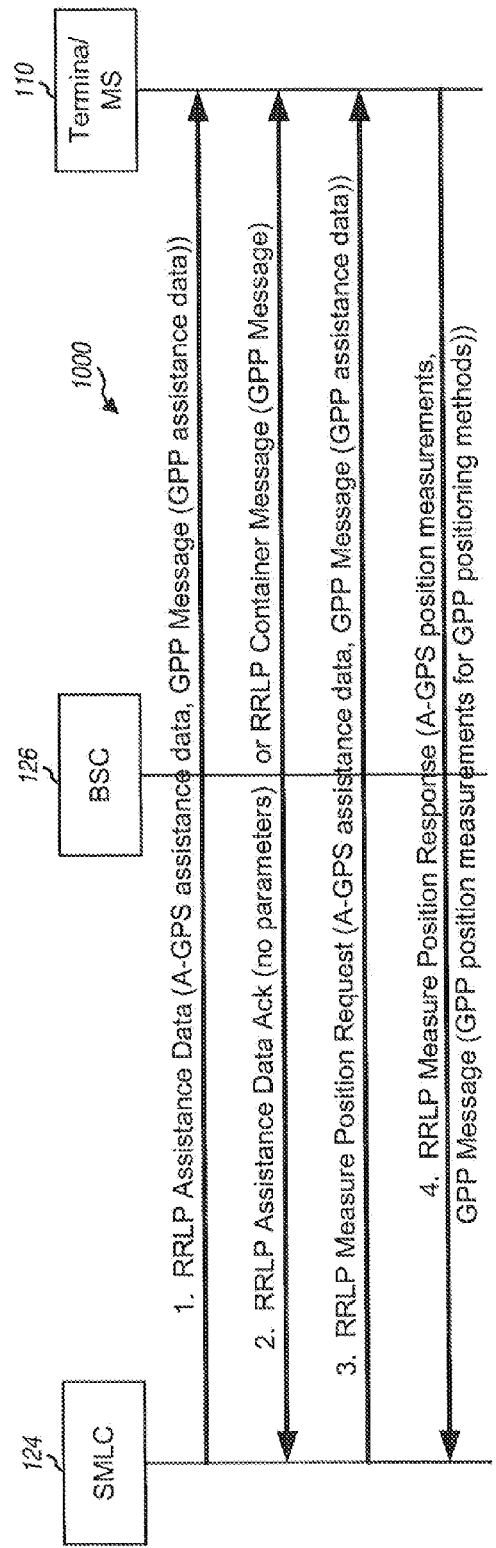

FIG. 10 shows a design of a message flow 1000 for use of both RRLP and GPP positioning methods in GSM control plane. In this example, an RRLP positioning method of A-GPS and a GPP positioning method may be supported concurrently. SMLC 124 may send an RRLP Assistance Data message carrying A-GPS assistance data and a GPP message, which may carry GPP assistance data. Terminal 110 may respond with an RRLP Assistance Data Ack message or an RRLP container message carrying a GPP message. SMLC 124 may send an RRLP Measure Position Request message carrying assistance data and a GPP message. Terminal 110 may respond with an RRLP Measure Position Response message carrying A-GPS position measurements and a GPP message, which may carry position measurements for the GPP positioning method.

FIG. 10 shows simultaneous use of RRLP to support A-GPS positioning and GPP to support other positioning methods. The position measurements returned to SMLC 124 may enable a more accurate position estimate than if A-GPS alone was used with RRLP. Other combinations of RRLP and GPP positioning methods may also be supported. In another design, a GPM may be substituted for each GPP message in FIG. 10.

Figure 11:
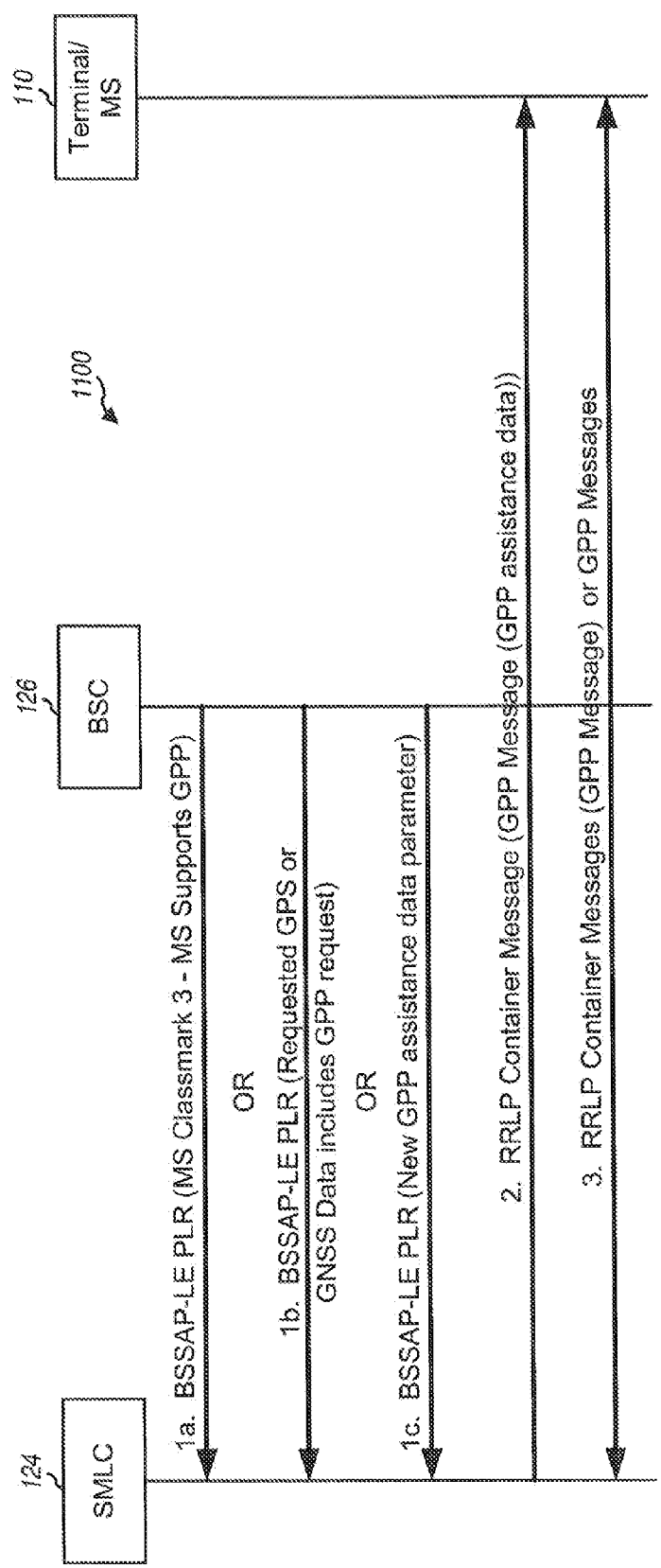

FIG. 11 shows a design of a message flow 1100 for delivering GPP assistance data in GSM control plane. GPP assistance data may include RRLP assistance data as well as new assistance data, e.g., for GLONASS, QZSS, etc. Use of GPP to deliver assistance data may be requested by (i) using a new MS Classmark 3 flag, (ii) by assigning spare bits in a Requested GPS Assistance Data message or a Requested GNSS Assistance Data message, (iii) by adding new parameter(s) to an MO-LR Request message, a BSSAP Perform Location Request message, a BSSAP-LE Perform Location Request message, or (iv) via some other mechanism. If SMLC 124 does not support GPP, then it may ignore the request for GPP assistance data and may send only assistance data that can be delivered using RRLP. Otherwise, SMLC 124 may send assistance data inside a GPP message carried by an RRLP container message. RRLP encapsulation may be used for the first GPP message because terminal 110 may not know whether SMLC 124 supports GPP and hence may expect to receive an RRLP message. Subsequent GPP messages may be sent un-encapsulated or encapsulated in RRLP container messages, since both entities have decided to use GPP.

Figure 12:
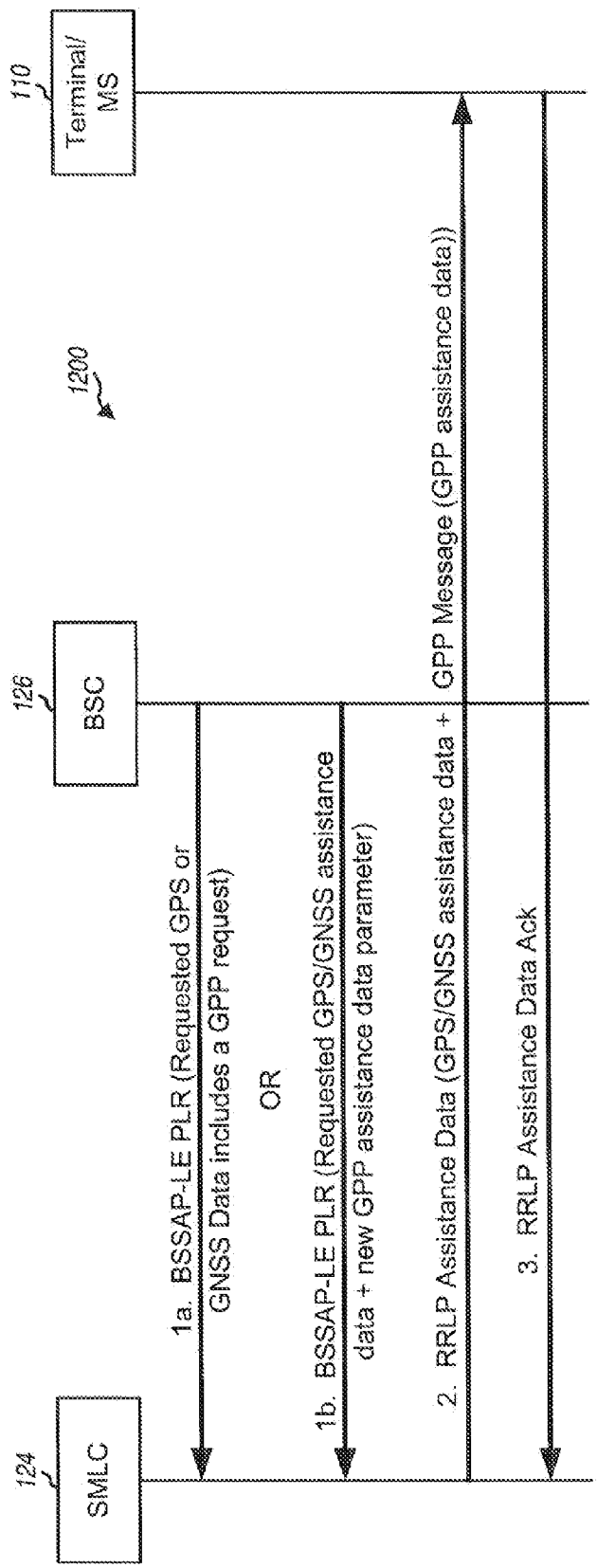

FIG. 12 shows a design of a message flow 1200 for delivering GPP assistance data in GSM control plane. Message flow 1200 may be used for MO-LR request for assistance data. In this design, an RRLP Assistance Data message may be used to transport RRLP assistance data and a GPP message. The GPP message may carry GPP assistance data, e.g., new assistance data for positioning methods supported by GPP.

GPP may also be used to support positioning for a control plane solution in GPRS. In this case, RRLP messages may be conveyed between terminal 110 and SMLC 124 inside BSSLAP, Base Station System GPRS Protocol (BSSGP), and Logical Link Control (LLC) Unconfirmed Information/Tunneling of Messages (UI/TOM) messages. These messages may be transparent to SGSN 134 and network entities within RAN 120. Hence, the message flows described above for GSM control plane may also be used for GPRS positioning instigated for MT-LR, NI-LR or MO-LR as well as MO-LR assistance data request.

V. GPP Positioning for UMTS Control Plane Solution

GPP may be used to support positioning for a control plane solution in UMTS. A Radio Network Controller (RNC) 128 within RAN 120 may be updated to support GPP in RNC centric and SAS centric modes.

Figure 13:
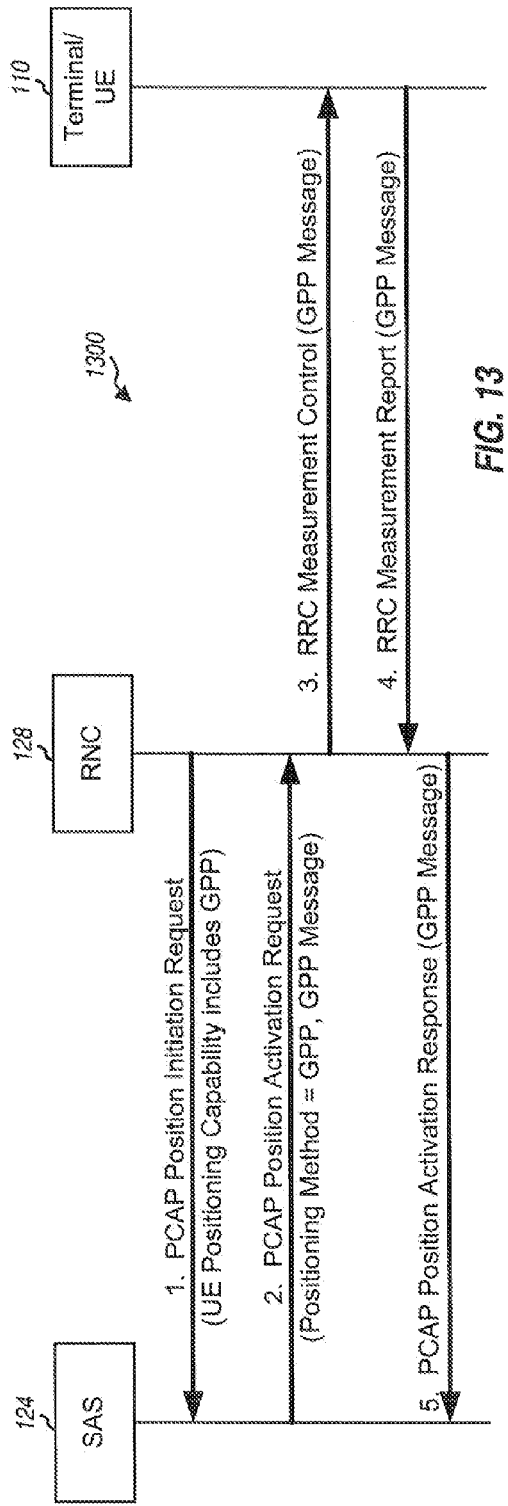

FIG. 13 shows a design of a message flow 1300 for GPP transport using existing RRC and Positioning Calculation Application Part (PCAP) messages for UMTS control plane. A new flag may be added to (e.g., a GNSS capabilities parameter of) an RRC Connection Setup Complete message to indicate terminal support for GPP. For SAS centric mode, the flag may be conveyed by RNC 128 to SAS 124 in a PCAP UE Positioning Capability IE sent in a PCAP Position Initiation Request message.

For PCAP between SAS 124 and RNC 128, GPP messages may be carried in PCAP Position Activation Request and Response messages and in PCAP Information Exchange Initiation Request and Response messages. A new positioning method may be used in a PCAP Activation Request message to indicate GPP. A new optional parameter in PCAP Information Exchange Initiation Request and Response messages may be used to convey a GPP message. For RRC between RNC 128 and terminal 110, GPP messages may be carried in RRC Measurement Control, Measurement Report, and Assistance Data Delivery messages.

Figure 14:
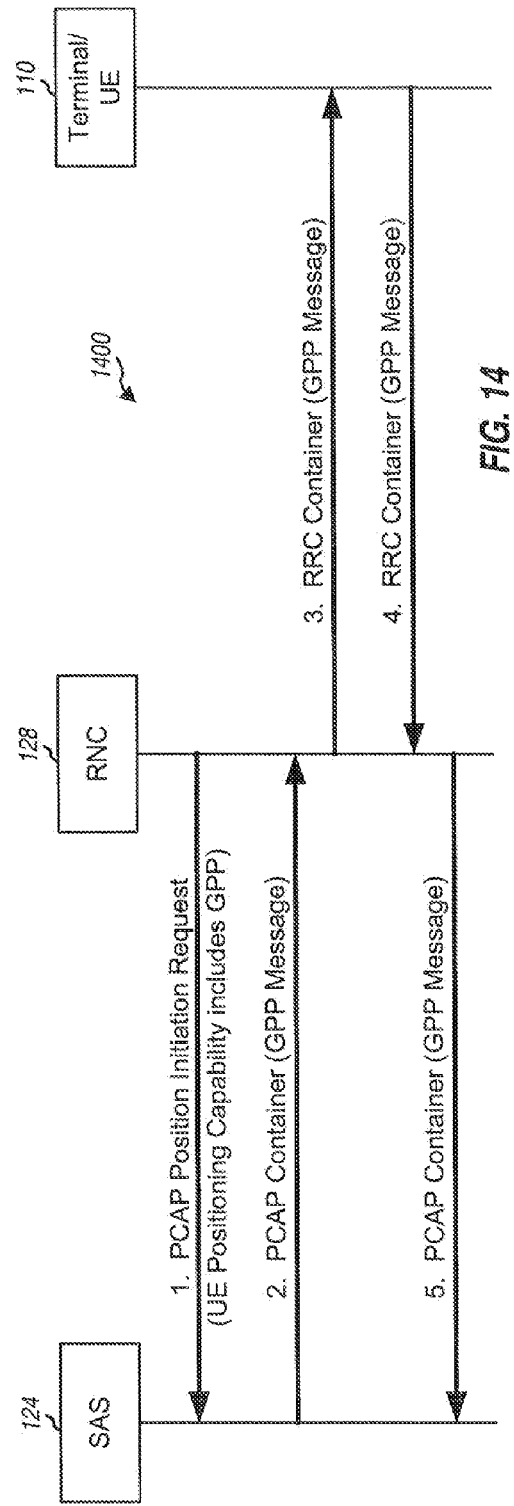

FIG. 14 shows a design of a message flow 1400 for GPP transport using PCAP and RRC container messages for UMTS control plane. PCAP container messages may be used to carry GPP messages exchanged between SAS 124 and RNC 128. RRC container messages may be used to carry GPP messages exchanged between RNC 128 and terminal 110.

Figure 15:
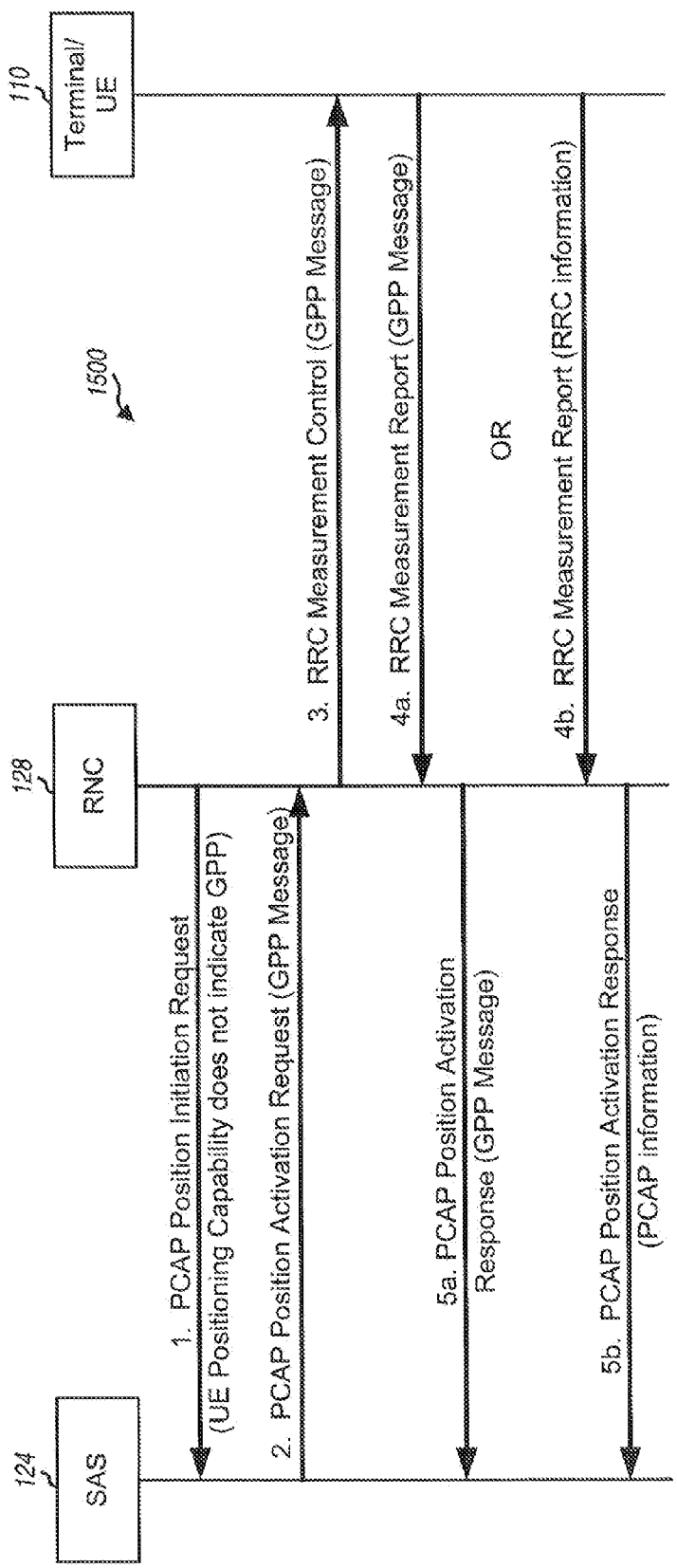

FIG. 15 shows a design of a message flow 1500 for GPP transport using existing PCAP and RRC messages, without a terminal flag indicating GPP support, for UMTS control plane. SAS 124 and RNC 128 may send a GPP message to terminal 110 in an initial PCAP or RRC message, without knowing if terminal 110 supports GPP. If terminal 110 does not support GPP, then it may ignore the GPP message and may return an RRC message (e.g., RRC Measurement Report message) containing information in response to receiving RRC defined information. Otherwise, terminal 110 may return a GPP message in a PCAP or RRC message.

For the UMTS control plane solution, existing PCAP and RRC messages for already defined positioning methods may be used to support GPP in order to reduce impact to terminal 110, RNC 128, and SAS 124. The PCAP and RRC messages may carry GPP messages, which may convey information for GPP positioning methods. The PCAP and RRC messages may then be used to support both RRC and GPP positioning methods.

VI. GPP Positioning for IS-801

GPP may be used to support positioning in IS-801. IS-801-1 (3GPP2 C.S0022-0) is currently deployed, IS-801-B (3GPP C.S0022-B) is currently defined, and a new version of IS-801 may be defined. GPP may be supported as a new version of IS-801. Terminal 110 and PDE 170 may expect to use some version of IS-801 and may not have negotiated GPP, e.g., when using a control plane solution for cdma2000 1xRTT, or when using SUPL 2.0 and GPP is not supported explicitly in SUPL 2.0. GPP negotiation may then be performed for IS-801.

A Position Determination Data Message (PDDM) may be sent for IS-801 and may include (i) a first octet carrying the particular session fields already defined for IS-801-0, IS-801-A and IS-801-B (e.g., a Session Start flag and a Session tag field), (ii) a second octet carrying a message type indication (PD_MSG_TYPE), (iii) two additional octets carrying a message length value (PD_MSG_LEN) indicating the length (N) of a subsequent PDU, and (iv) N octets carrying the PDU. The PD_MSG_TYPE may be set to 1x00 for IS-801-1, to 1x01 for IS-801-A, or to 1x02 for IS-801-B, where "1x" denotes a hexadecimal value. To support GPP negotiation in IS-801, a new PD_MSG_TYPE value (e.g., a hexadecimal value of 1xFF) may be defined. The new PD_MSG_TYPE value may be used to identify GPP, which may be considered as a version of IS-801 that is later than IS-801-B.

A GPP PDDM may be generated in similar manner as an IS-801-B PDDM except for the new PD_MSG_TYPE value and with a GPP message replacing an IS-801-B PDU. The GPP PDDM may include (i) the first octet carrying the same flags and fields as for other IS-801 versions (e.g., SESS_START, SESS_END, SESS_SOURCE and SESS_TAG), (ii) the second octet carrying the new PD_MSG_TYPE value, (iii) the next two octets carrying PD_MSGLEN, and (iv) the remaining octets carrying the GPP message.

FIG. 16 shows a design of a message flow 1600 for GPP negotiation when GPP is supported as a new version of IS-801. Terminal 110 or PDE 170 may support IS-801-1, GPP, and IS-801-B and may start an IS-801 session by sending a sequence of three PDDMs for IS-801-1, IS-801-B, and GPP in that order. The receiving entity (which may be PDE 170 if terminal 110 is sending or may be terminal 110 if PDE 170 is sending) may then process and reply to the highest version PDDM supported by that entity from among the three alternatives provided by the sending entity (i.e., IS-801-1, IS-801-B, and GPP, which may be considered a higher version of IS-801 than IS-801-B). The receiving entity would reply to the received GPP PDDM if GPP is supported and would then return a GPP PDDM response. The receiving entity would also ignore the PDDMs that it received for the other two IS-801 versions. If terminal 110 or PDE 170 only supports IS-801-1 and GPP, it would instead start the session by sending a sequence of only two PDDMs for IS-801-1 and GPP in that order. The receiving entity may then reply to the highest version supported by that entity from among the two alternatives provided (i.e., IS-801-1 and GPP). The receiving entity would reply to the GPP PDDM if GPP is supported and would then return a GPP PDDM response.

FIG. 17 shows a design of a message flow 1700 for GPP negotiation in IS-801-B using a shortcut to avoid sending three full size PDDMs initially when IS-801-1, IS-801-B, and GPP are all deployed. Terminal 110 or PDE 170 may support 801-1, 801-B, and GPP and may start an IS-801 session by sending a full 801-1 PDDM, a truncated 801-B PDDM, and a full GPP PDDM in that order. The truncated IS-801-B PDDM may carry the first four octets of a normal PDDM indicating IS-801-B support but no IS-801-B PDU. A receiving entity may return a GPP PDDM if it supports GPP, and the IS-801 session may continue with GPP. The receiving entity may return an IS-801-B PDDM if it supports IS-801-B but not GPP, and the IS-801 session may continue using IS-801-B.

If IS-801-B deployment exceeds or is comparable to GPP deployment, then a full IS-801-B PDDM and an empty GPP PDDM may be sent initially instead of an empty IS-801-B PDDM and a full GPP PDDM. Alternatively, a full 801-1 PDDM, an empty IS-801-B PDDM, and an empty GPP PDDM may be sent.

PDE 170 may support IS-801-1, IS-801-B, and GPP. Terminal 110 may support IS-801-1 and either IS-801-B or GPP. Terminal 110 may also support only IS-801-B or only GPP. A terminal-initiated IS-801 session may be efficient because only one or two PDDMs may be sent. For a PDE-initiated IS-801 session, sending a full IS-801-1 PDDM and two empty PDDMs for IS-801-B and GPP may reduce overhead.

VII. GPP Positioning for LTE

GPP may be used to support positioning for LTE. Location services for terminals accessing an LTE network may be supported with a control plane solution or a user plane solution. In a control plane solution, a specific positioning protocol may be used for each wireless access type and may support position measurements (e.g., measurements of signals from base stations) and location information related to that wireless access type. The specific positioning protocol for LTE with a control plane location solution may be GPP. The GPP usable for LTE positioning with a control plane solution may also be used to support LTE positioning with a user plane solution such as SUPL. GPP may also be used with control and user plane solutions for other wireless access types such as WiMax, WiFi, UMB, IMT Advanced, etc.

Figure 18:
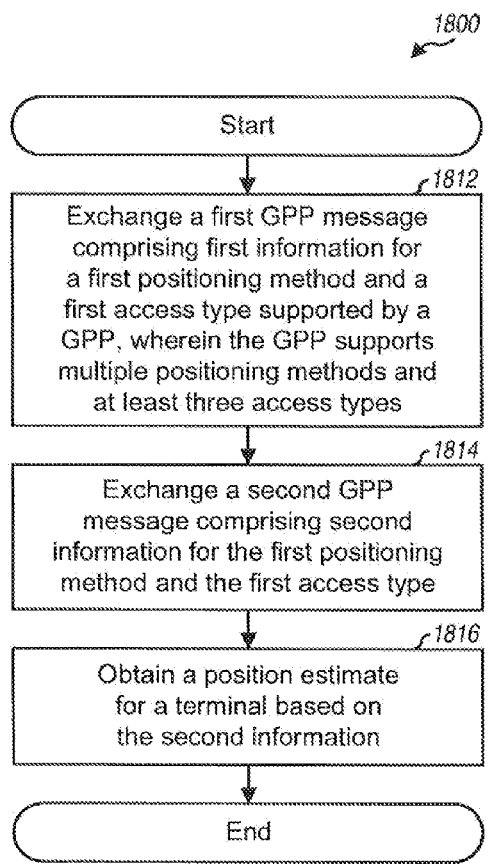
FIG. 18 shows a process for performing positioning with GPP.

FIG. 18 shows a design of a process 1800 for performing positioning. Process 1800 may be performed by a terminal, a location server (e.g., an SLP), or some other entity. A first GPP message comprising first information for a first positioning method and a first access type supported by a GPP may be exchanged (block 1812). The GPP may support multiple positioning methods and at least three access types. A second GPP message comprising second information for the first positioning method and the first access type may be exchanged (block 1814). A position estimate for a terminal may then be obtained based on the second information (block 1816).

In one design of blocks 1812 and 1814, the location server may send the first GPP message comprising a request for location information to the terminal and may receive the second GPP message comprising the location information from the terminal. The location server may also receive a third GPP message comprising a request for assistance data from the terminal and may send a fourth GPP message comprising the assistance data to the terminal. The third and fourth GPP messages may be exchanged before or after the first and second GPP messages.

In another design of blocks 1812 and 1814, the terminal may receive the first GPP message comprising a request for location information from the location center and may send the second GPP message comprising the location information to the location center. The terminal may send a third GPP message comprising a request for assistance data to the location center and may receive a fourth GPP message comprising the assistance data from the location center.

In one design, each GPP message may comprise at least one position element. Each position element may be for a specific positioning method and may carry information for the positioning method. For example, the first GPP message may include (i) a first position element comprising the first information for the first positioning method and (ii) a second position element comprising information for a GNSS positioning method.

In one design, at least one message for a second positioning protocol may be exchanged before steps 1812 and 1814 in order to determine whether the terminal supports the GPP. The second positioning protocol may comprise RRLP, RRC, or IS-801. The multiple positioning methods supported by the GPP may comprise GNSS positioning method, OTD positioning method, WiFi related positioning method, sensor (e.g., accelerometer) related positioning method, an E-CID positioning method, and/or other positioning methods. The at least three access types supported by the GPP may comprise GSM, WCDMA, CDMA 1X, HRPD, LTE, IEEE 802.11, IEEE 802.16, and/or some other access types.

Figure 19:
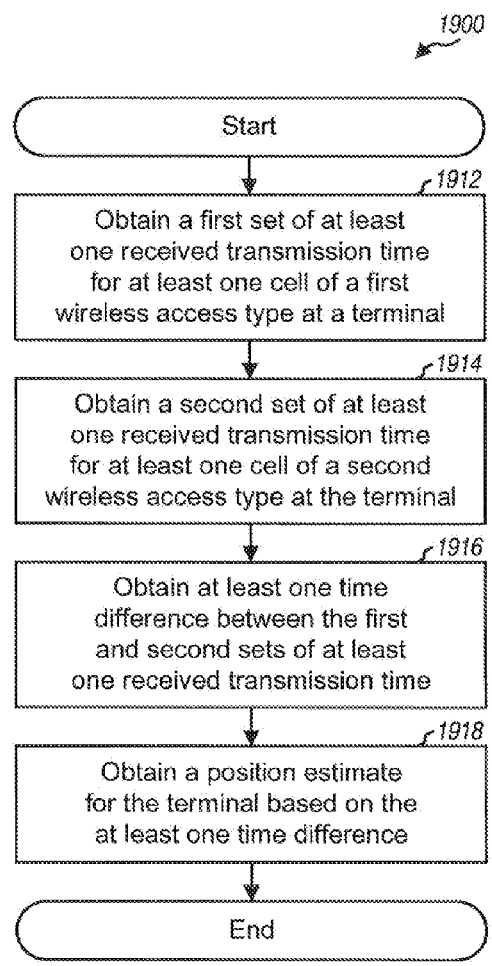
FIG. 19 shows a process for performing positioning with received transmission times for multiple wireless access types.

FIG. 19 shows a design of a process 1900 for performing positioning. Process 1900 may be performed by a terminal (as described below) or by some other entity. The terminal may obtain a first set of at least one received transmission time for at least one cell of a first wireless access type (block 1912). The terminal may also obtain a second set of at least one received transmission time for at least one cell of a second wireless access type (block 1914). The terminal may obtain at least one time difference between the first and second sets of at least one received transmission time (block 1916). The terminal may obtain a position estimate for itself based on the at least one time difference (block 1918).

In one design of block 1916, the terminal may convert the first set of at least one received transmission time to a first set of at least one converted time based on common timing, which may be applicable for multiple wireless access types. The terminal may also convert the second set of at least one received transmission time to a second set of at least one converted time based on the common timing. The at least one time difference may then be determined based on the first and second sets of at least one converted time.

The terminal may relate the real timing of the cells of each wireless access type to the common timing by associating a real time for a cell of that wireless access type to a converted time defined by the common timing. The terminal may convert the received transmission time for each cell as follows. The terminal may determine an integer portion of cyclic periods for the received transmission time based on absolute timing at the terminal. The terminal may also obtain a fractional portion of a cyclic period for the received transmission time based on a timing measurement for the cell. The terminal may then determine a converted time for the cell based on the integer portion and the fractional portion of the received transmission time.

In one design of block 1918, the terminal may compute the position estimate for itself based on the at least one time difference. In another design, the terminal may send the at least one time difference to the location server and may receive the position estimate for itself from the location server.

Figure 20:
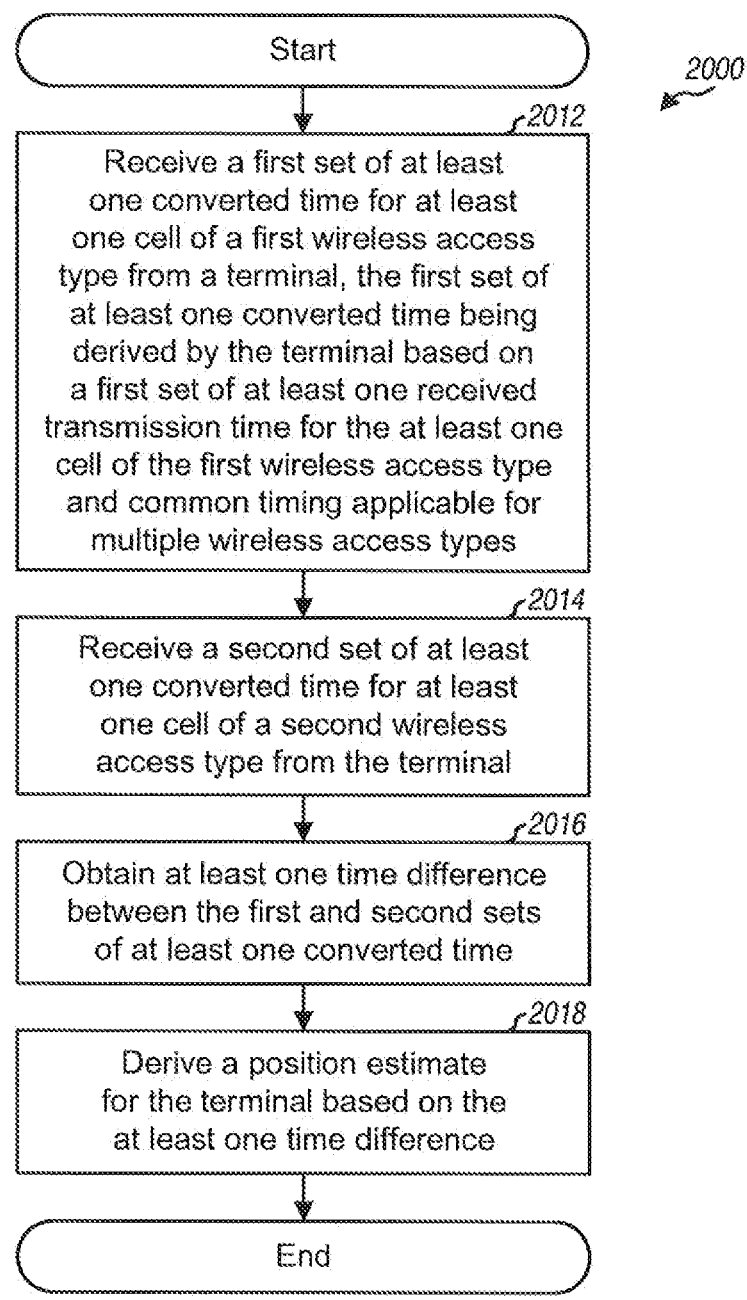
FIG. 20 shows a process for performing positioning with converted times.

FIG. 20 shows a design of a process 2000 for performing positioning. Process 2000 may be performed by a location server (as described below) or by some other entity. The location server may receive a first set of at least one converted time for at least one cell of a first wireless access type from a terminal (block 2012). The first set of at least one converted time may be derived by the terminal based on a first set of at least one received transmission time for the at least one cell of the first wireless access type and common timing applicable for multiple wireless access types.

The location server may also receive a second set of at least one converted time for at least one cell of a second wireless access type from the terminal (block 2014). The second set of at least one converted time may be derived by the terminal based on a second set of at least one received transmission time for the at least one cell of the second wireless access type and the common timing. The location server may obtain at least one time difference between the first and second sets of at least one converted time (block 2016). The location server may then derive a position estimate for the terminal based on the at least one time difference (block 2018).

In one design of blocks 2016 and 2018, the location server may determine OTDs between multiple cells based on the converted times for the cells. The location server may then derive the position estimate for the terminal based on the OTDs and known locations of the cells. In another design of blocks 2016 and 2018, the location server may determine an OTD between a first cell of the first wireless access type and a second cell of the second wireless access type based on the converted times for these cells. The location server may then derive the position estimate for the terminal based on the OTD and known locations of the first and second cells and possibly OTDs and known locations of other cells.

In another design, the location server may receive time differences from the terminal and may then perform the time conversion on the received time differences.

Figure 21:
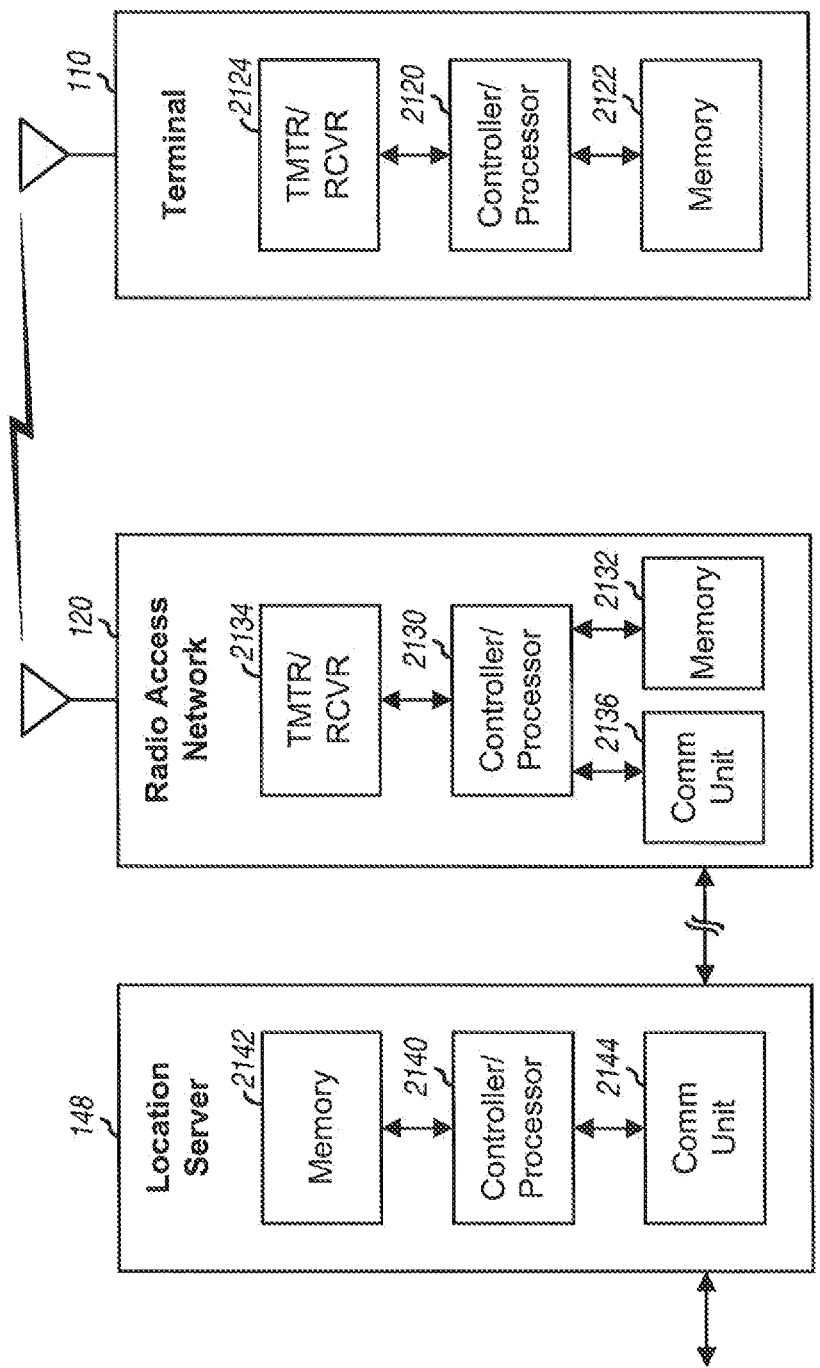
FIG. 21 shows a block diagram of a terminal, a radio access network (RAN), and a location server.

FIG. 21 shows a block diagram of a design of terminal 110, RAN 120, and location server 148 in FIG. 1. For simplicity, FIG. 21 shows only one controller/processor 2120, one memory 2122, and one transmitter/receiver (TMTR/RCVR) 2124 for terminal 110, only one controller/processor 2130, one memory 2132, one transmitter/receiver 2134, and one communication (Comm) unit 2136 for RAN 120, and only one controller/processor 2140, one memory 2142, and one communication unit 2144 for location server 148. In general, each entity may include any number of processors, controllers, memories, transmitters/receivers, communication units, etc.

On the downlink, RAN 120 may transmit traffic data, signaling, and pilot to terminals within its coverage area. These various types of information may be processed by processor 2130, conditioned by transmitter 2134, and transmitted on the downlink. At terminal 110, downlink signals from RAN 120 may be received and conditioned by receiver 2124 and further processed by processor 2120 to obtain various types of information. Processor 2120 may perform process 1800 in FIG. 18, process 1900 in FIG. 19, and/or other processes for the techniques described herein. Memories 2122 and 2132 may store program codes and data for terminal 110 and RAN 120, respectively. On the uplink, terminal 110 may transmit traffic data, signaling, and pilot to RAN 120. These various types of information may be processed by processor 2120, conditioned by transmitter 2124, and transmitted on the uplink. At RAN 120, the uplink signals from terminal 110 and other terminals may be received and conditioned by receiver 2134 and further processed by processor 2130 to obtain various types of information from the terminals. RAN 120 may directly or indirectly communicate with location server 148 via communication unit 2136.

Within location server 148, processor 2140 may perform processing to support location services for terminals. For example, processor 2140 may perform process 1800 in FIG. 18, process 2000 in FIG. 20, and/or other processes for the techniques described herein. Processor 2140 may also compute position estimates for terminal 110, provide location information to LCS client 190, etc. Memory 2142 may store program codes and data for location server 148. Communication unit 2144 may allow location server 148 to communicate with terminal 110, RAN 120, and/or other network entities. Location server 148 and terminal 110 may exchange messages via GPP, and these messages may be transported by RAN 120 and other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Headings are included herein for reference and to aid in locating certain sections. These headings are not intended to limit the scope of the concepts described therein under, and these concepts may have applicability in other sections throughout the entire specification.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of performing positioning, comprising:
   exchanging a first generic positioning protocol (GPP) message comprising first information for a first positioning method and a first wireless access type supported by a GPP, wherein the GPP supports multiple positioning methods and at least three wireless access types;
   exchanging a second GPP message comprising second information for the first positioning method and the first wireless access type; and
   obtaining a position estimate for a terminal based on the second information.

2. The method of claim 1, wherein the exchanging the first GPP message comprises receiving the first GPP message comprising a request for location information from a location center, and wherein the exchanging the second GPP message comprises sending the second GPP message comprising the location information to the location center.

3. The method of claim 1, further comprising:
   sending a third GPP message comprising a request for assistance data to a location center; and
   receiving a fourth GPP message comprising the assistance data from the location center.

4. The method of claim 1, further comprising:
   receiving a third GPP message comprising a request for assistance data from the terminal; and
   sending a fourth GPP message comprising the assistance data to the terminal.

5. The method of claim 1, further comprising:
   obtaining at least one position element from the first GPP message, each position element being for a specific positioning method and carrying information for the specific positioning method.

6. The method of claim 1, further comprising:
   obtaining first and second position elements from the first GPP message, the first position element comprising the first information for the first positioning method, and the second position element comprising information for a Global Navigation Satellite System (GNSS) positioning method.

7. The method of claim 1, further comprising:
exchanging at least one message for a second positioning protocol to determine whether the terminal supports the GPP.

8. The method of claim 7, wherein the second positioning protocol comprises Radio Resource LCS Protocol (RRLP), Radio Resource Control (RRC), or IS-801.

9. The method of claim 1, wherein the multiple positioning methods supported by the GPP comprise at least one of an observed time difference (OTD) positioning method, a Global Navigation Satellite System (GNSS) positioning method, and an enhanced cell identity (E-CID) positioning method.

10. The method of claim 1, further comprising:
obtaining a positioning method identifier (ID) from the GPP message; and
determining whether the first positioning method is an existing or a new positioning method based on the positioning method ID.

11. The method of claim 1, wherein the at least three wireless access types supported by the GPP comprise at least one of Global System for Mobile Communications (GSM), Wideband Code Division Multiple Access (WCDMA), CDMA IX, High Rate Packet Data (HRPD), Long Term Evolution (LTE), IEEE 802.11, and IEEE 802.16.

12. An apparatus for performing positioning, comprising:
means for exchanging a first generic positioning protocol (GPP) message comprising first information for a first positioning method and a first wireless access type supported by a GPP, wherein the GPP supports multiple positioning methods and at least three wireless access types;
means for exchanging a second GPP message comprising second information for the first positioning method and the first wireless access type; and
means for obtaining a position estimate for a terminal based on the second information.

13. The apparatus of claim 12, wherein the means for exchanging the first GPP message comprises means for receiving the first GPP message comprising a request for location information from a location center, and wherein the means for exchanging the second GPP message comprises means for sending the second GPP message comprising the location information to the location center.

14. The apparatus of claim 12, further comprising:
means for sending a third GPP message comprising a request for assistance data to a location center; and
means for receiving a fourth GPP message comprising the assistance data from the location center.

15. The apparatus of claim 12, further comprising:
means for obtaining first and second position elements from the first GPP message, the first position element comprising the first information for the first positioning method, and the second position element comprising information for a Global Navigation Satellite System (GNSS) positioning method.

16. The apparatus of claim 12, further comprising:
means for exchanging at least one message for a second positioning protocol to determine whether the terminal supports the GPP.

17. An apparatus for performing positioning, comprising:
at least one processor configured to exchange a first generic positioning protocol (GPP) message comprising first information for a first positioning method and a first wireless access type supported by a GPP, wherein the GPP supports multiple positioning methods and at least three wireless access types, to exchange a second GPP message comprising second information for the first positioning method and the first wireless access type, and to obtain a position estimate for a terminal based on the second information.

18. The apparatus of claim 17, wherein the at least one processor is configured to receive the first GPP message comprising a request for location information from a location center, and to send the second GPP message comprising the location information to the location center.

19. The apparatus of claim 17, wherein the at least one processor is configured to send a third GPP message comprising a request for assistance data to a location center; and to receive a fourth GPP message comprising the assistance data from the location center.

20. A non-transitory computer readable medium, comprising:
code for causing at least one computer to exchange a first generic positioning protocol (GPP) message comprising first information for a first positioning method and a first wireless access type supported by a GPP, wherein the GPP supports multiple positioning methods and at least three wireless access types;
code for causing the at least one computer to exchange a second GPP message comprising second information for the first positioning method and the first wireless access type; and
code for causing the at least one computer to obtain a position estimate for a terminal based on the second information.

* * * * *